US010013601B2

(12) United States Patent
Ebersman et al.

(10) Patent No.: US 10,013,601 B2
(45) Date of Patent: Jul. 3, 2018

(54) IDEOGRAMS FOR CAPTURED EXPRESSIONS

(71) Applicant: Facebook, Inc., Menlo Park, CA (US)

(72) Inventors: David Ebersman, Hillsborough, CA (US); Samuel Lessin, San Francisco, CA (US); Thomas Stocky, Los Altos, CA (US); Michael Vernal, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 300 days.

(21) Appl. No.: 14/173,447

(22) Filed: Feb. 5, 2014

(65) Prior Publication Data

US 2015/0220774 A1  Aug. 6, 2015

(51) Int. Cl.
*G06K 9/00* (2006.01)
*G06K 9/62* (2006.01)
(Continued)

(52) U.S. Cl.
CPC .......... *G06K 9/00308* (2013.01); *G06F 3/011* (2013.01); *G06F 3/0482* (2013.01);
(Continued)

(58) Field of Classification Search
CPC .......... G06K 9/00281; G06K 9/00268; G06K 9/00302; G06K 9/629; G06K 9/00845
See application file for complete search history.

(56) References Cited

U.S. PATENT DOCUMENTS 5,774,591 A * 6/1998 Black .............. G06K 9/00315
382/118
8,290,478 B2 10/2012 Shim
(Continued)

FOREIGN PATENT DOCUMENTS

JP  2005-182368   7/2005
JP  2010-277588   12/2010
(Continued)

OTHER PUBLICATIONS

International Search Report and Written Opinion for International Application PCT/US2014/015026, dated Oct. 31, 2014.
(Continued)

*Primary Examiner* — Ahamed I Nazar
(74) *Attorney, Agent, or Firm* — Baker Botts L.L.P.

(57) ABSTRACT

Particular embodiments of a method comprise analyzing an image to classify an expression displayed on a face shown in a captured image. Image analysis may include detecting the face in the image, generating a characterization of features of the face, and classifying the expression based on the characterization. The characterization of facial features may be based on benchmark metrics for a particular expression. One or more ideograms (e.g., written characters, symbols or images that represent an idea or thing) may be selected based on the expression. The selection may be based on one or more match scores for the expression. The match scores may be determined based on an ideogram dictionary or an ideogram usage history. The selected ideograms may then be presented, in association with the face, on a screen for the computing device.

20 Claims, 18 Drawing Sheets

(51) Int. Cl.
*G06F 3/01* (2006.01)
*G06F 3/0482* (2013.01)
*G06F 3/0481* (2013.01)
*G06F 17/27* (2006.01)
*H04M 1/725* (2006.01)

(52) U.S. Cl.
CPC ........ *G06F 3/04817* (2013.01); *G06F 17/276* (2013.01); *G06F 17/2785* (2013.01); *G06F 2203/011* (2013.01); *H04M 1/72547* (2013.01)

(56) References Cited

U.S. PATENT DOCUMENTS

| | | | | |
|---|---|---|---|---|
| 2002/0109719 | A1* | 8/2002 | Hata | G06T 17/00 715/748 |
| 2005/0069852 | A1* | 3/2005 | Janakiraman | H04M 1/2474 434/236 |
| 2005/0256712 | A1 | 11/2005 | Yamada | |
| 2006/0053386 | A1* | 3/2006 | Kuhl | G06F 3/0236 715/773 |
| 2006/0079293 | A1* | 4/2006 | Nelson | H04M 1/72547 455/566 |
| 2006/0115157 | A1* | 6/2006 | Mori | G06K 9/00221 382/190 |
| 2008/0171573 | A1* | 7/2008 | Eom | H04M 1/72572 455/556.2 |
| 2009/0110246 | A1* | 4/2009 | Olsson | H04M 1/72544 382/118 |
| 2010/0123724 | A1* | 5/2010 | Moore | G06F 3/04817 345/473 |
| 2010/0177116 | A1* | 7/2010 | Dahllof | G06F 3/011 345/619 |
| 2010/0179991 | A1 | 7/2010 | Lorch | |
| 2011/0007174 | A1* | 1/2011 | Bacivarov | G06K 9/00281 348/222.1 |
| 2011/0009109 | A1* | 1/2011 | Hyon | H04M 1/72544 455/418 |
| 2011/0093272 | A1* | 4/2011 | Isobe | G10L 13/10 704/258 |
| 2011/0294525 | A1* | 12/2011 | Jonsson | G06F 17/27 455/466 |
| 2012/0101735 | A1* | 4/2012 | Velusamy | G06K 9/00315 702/19 |
| 2013/0154980 | A1* | 6/2013 | Byrnes | G06F 3/01 345/173 |
| 2013/0159919 | A1* | 6/2013 | Leydon | G06F 3/0236 715/780 |
| 2014/0022370 | A1* | 1/2014 | Sohn | G06K 9/00315 348/78 |
| 2014/0050373 | A1* | 2/2014 | Kiyosawa | G06K 9/00268 382/118 |
| 2014/0067397 | A1* | 3/2014 | Radebaugh | G10L 13/08 704/260 |
| 2014/0156398 | A1* | 6/2014 | Li | G06Q 30/0251 705/14.53 |
| 2014/0279418 | A1* | 9/2014 | Rubinstein | G06Q 40/00 705/39 |
| 2014/0323817 | A1* | 10/2014 | el Kaliouby | A61B 5/165 600/300 |
| 2015/0052462 | A1* | 2/2015 | Kulkarni | G06F 3/04817 715/765 |
| 2015/0055834 | A1* | 2/2015 | Zou | G06K 9/00281 382/118 |
| 2015/0127753 | A1* | 5/2015 | Tew | G06Q 30/0251 709/206 |
| 2015/0193507 | A1* | 7/2015 | Rappoport | G06Q 10/101 382/118 |
| 2015/0220774 | A1* | 8/2015 | Ebersman | G06K 9/00308 382/118 |
| 2015/0286371 | A1* | 10/2015 | Degani | G06F 17/274 705/14.64 |
| 2015/0317511 | A1* | 11/2015 | Li | G06K 9/00248 382/118 |
| 2016/0004905 | A1* | 1/2016 | Lucey | G06T 13/40 348/14.08 |

FOREIGN PATENT DOCUMENTS

| | | |
|---|---|---|
| JP | 2011-043938 | 3/2011 |
| JP | 2011-138343 | 7/2011 |
| JP | 2013-206389 | 10/2013 |
| JP | 2015-507791 | 3/2015 |
| WO | 2007/080570 A1 | 7/2007 |

OTHER PUBLICATIONS

Notification of Reason for Rejection for JP 2016-550199, dated Nov. 7, 2017.

Emura, Yuka et al. "Facemark Recommendation Based on Emotion, Communication and Motion Type Estimation in Microblogs," Journal of Natural Language Processing, The Association for Natural Language Processing, Japan, vol. 19, No. 5 (English translation of abstract provided), Dec. 14, 2012.

* cited by examiner

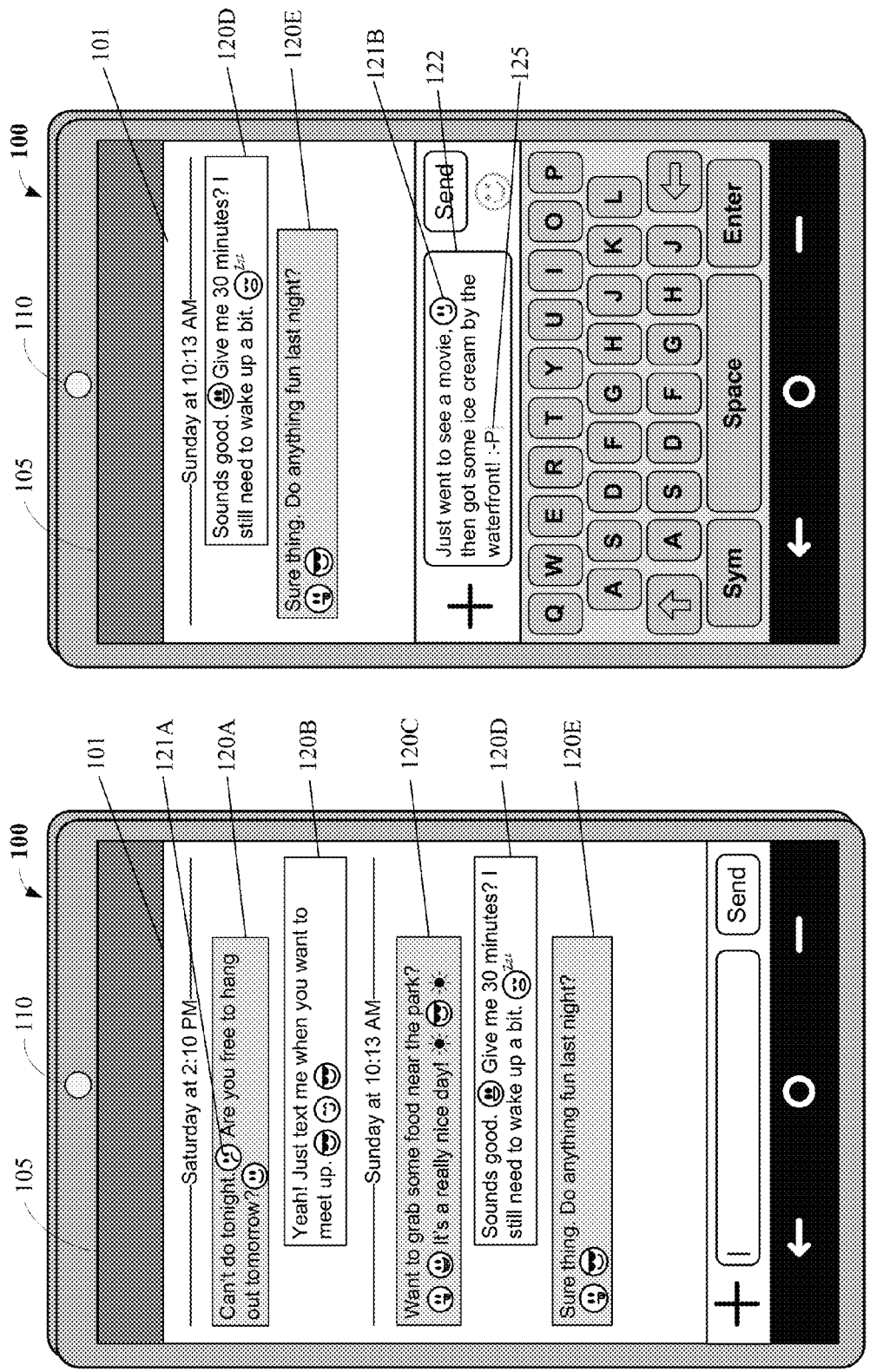

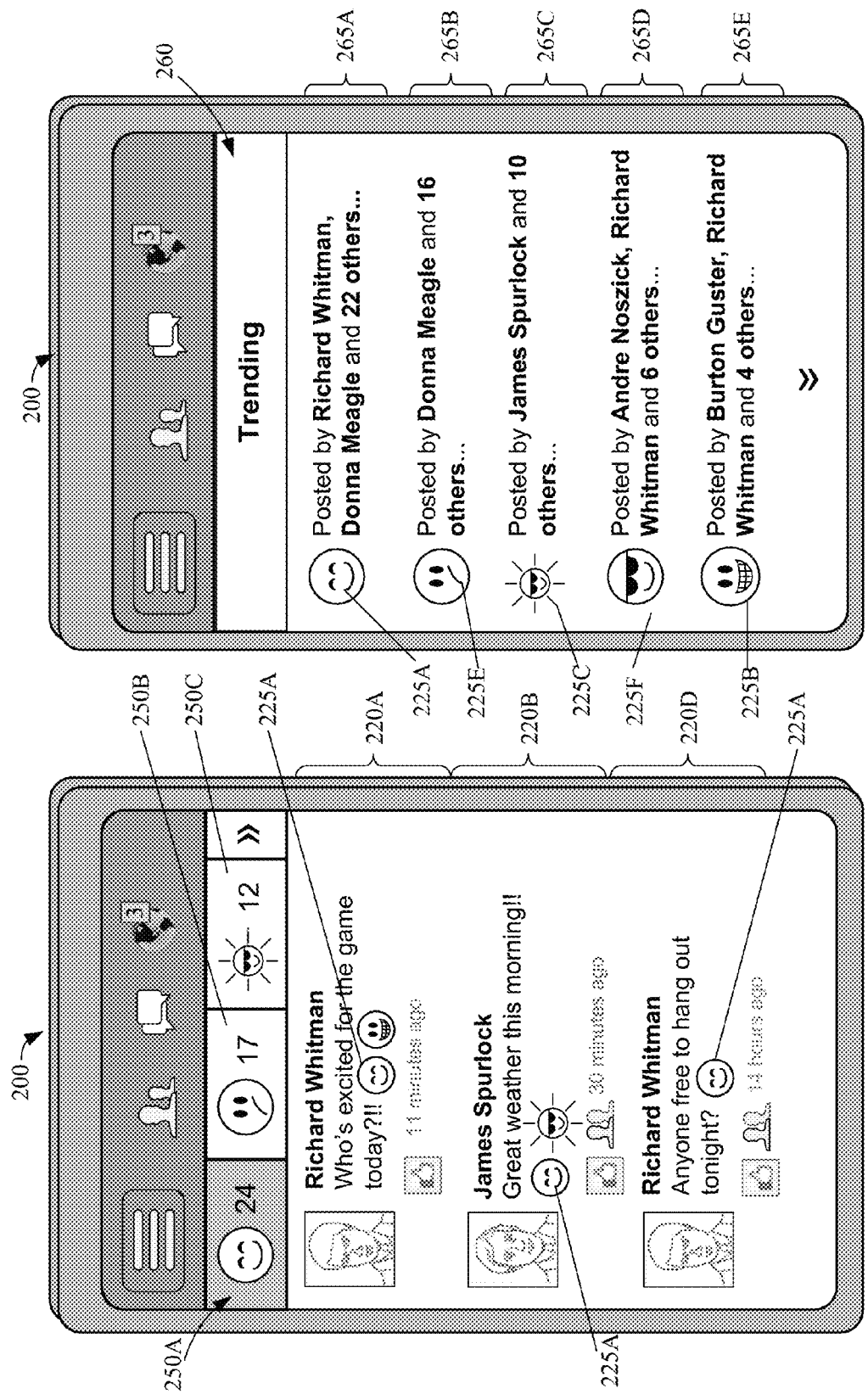

IDEOGRAMS FOR CAPTURED EXPRESSIONS

TECHNICAL FIELD

This disclosure generally relates to presentation of content on a computing device.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

Particular embodiments described in this disclosure relate to the use of ideograms in a text message input by an authoring user on a computing device. The author may input text on a mobile device to be sent to other users through a number of methods, including for example a messaging platform or a social-networking system. The ideograms will be sent to other users along with the message, and the receiving users will be able to view the ideogram in conjunction with the text message in the same relative layout as the author's created message.

In one particular embodiment, one or more of the ideograms that may be placed in a message may have restrictions on use or viewing. A user of the messaging platform or social-networking system may need to be authorized in order to use the ideogram in a message sent by that user, or to view the ideogram in messages sent by other users. User authorization may be set by any of multiple methods, for example by membership in a particular group, certain attributes of the user's profile, or by purchasing access to a sticker pack containing the restricted ideogram. If an unauthorized user attempts to use or view the restricted ideogram, the user may be presented instead with a warning message that he or she is unable to use or view the ideogram. The warning message may further inform the unauthorized user how he or she may gain authorization.

In another particular embodiment, the author of a message may input text that can be analyzed by the computing device for the sentiment contained within the text. Sentiment analysis conducted on at least a portion of the input text may result in the identification of one or more sentiments. One or more ideograms may then be suggested to the author that can substitute or supplement the analyzed text. The suggestion of ideograms may be user-specific, by the use of that individual author's ideogram usage history or personal ideogram dictionary. The suggestion may also be based on the ideogram usage history of others connected to the user, such as users sharing a common demographic attribute with the author or directed connected to the author in a social network.

In another particular embodiment, expression analysis may be performed on the subject(s) of a captured image. The expression analysis may result in one or more expressions displayed by the subjects of the captured image. One or more ideograms that can be substituted for the captured image may be suggested. The suggestion of ideograms may be user-specific, by the use of that individual author's ideogram usage history or personal ideogram dictionary. The suggestion may also be based on the ideogram usage history of others connected to the user, such as users sharing a common demographic attribute with the author or directed connected to the author in a social network.

BRIEF DESCRIPTION OF THE DRAWINGS

FIG. 1A illustrates a mobile device with a text message thread containing ideograms within the messages.

FIG. 1B illustrates a mobile device with a text message thread and a text entry area displayed, with the user typing in characters to trigger the display of Unicode ideograms.

FIG. 2C illustrates a mobile device with a social network newsfeed displaying status update messages from other users that are filtered for only updates containing a particular ideogram.

FIG. 2D illustrates a mobile device displaying a list of trending ideograms, sorted by popularity amongst direct connections in a social network.

DESCRIPTION OF EXAMPLE EMBODIMENTS

Figure 1C:
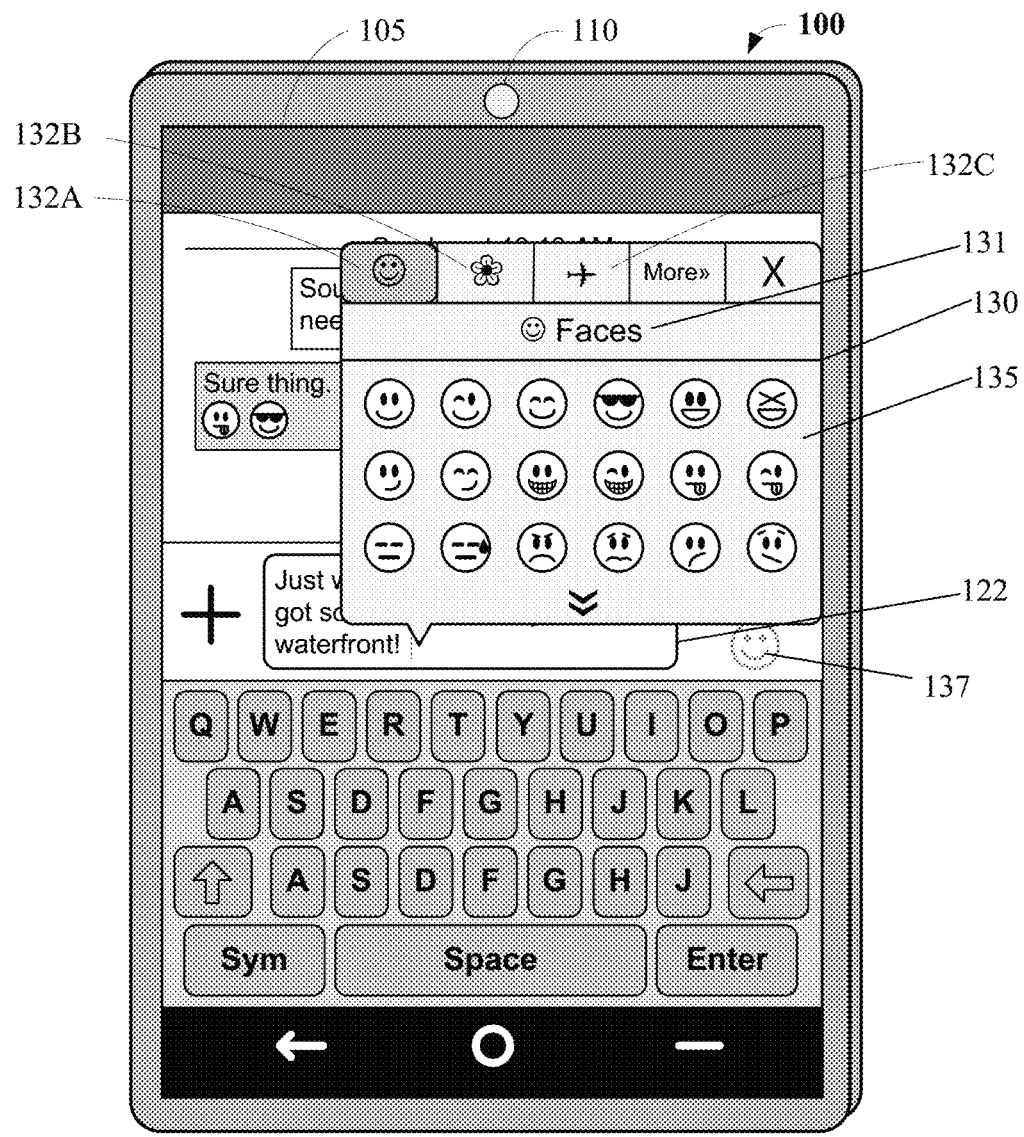
FIG. 1C illustrates a mobile device showing a text message thread and a text entry area, with a pull-down menu displaying a sticker pack of ideograms.

Particular embodiments feature the use of ideograms within visual digital messages. Ideograms may be written characters, symbols or images that represent an idea or thing without using letters or words; examples may be the gender symbols ♀ and ♂, or images of a bunny with a smiling or angry expression. Ideograms may be inserted into text using digital images presented to an author of the text in a "sticker pack", where a group of ideograms sharing a common theme or style may be displayed in a user interface enabling the author to select ideograms to be inserted into the text. Alternatively ideograms may be inserted through standards like Unicode which convert specific text strings to ideograms. For example, typing in the characters ":)" into an application that recognizes Unicode ideograms will convert those characters into the ideogram ☺.

Messages may be sent between two computing devices using any of a number of messaging platforms including but not limited to e-mail, Short Messages Service (SMS), or instant message (IM). Messages may also be "broadcast" by an author to one or more recipients, e.g. through posting a message or status update on a social networking system, or by posting a message on a platform such as Twitter. An ideogram may be inserted into a message and displayed within the image at any of a number of points in time: they may be displayed when the author types in the ideogram into the message; when the author chooses to send the finished message; on the receiving device as the message is being received; or when the recipient opens the message to read the message.

FIG. 1A shows an example embodiment wherein ideograms depicting expressive faces (sometimes called emoticons or "emoji"), may be embedded within the text 120A-E of a messaging platform 101 depicted on a front display 105 of a mobile device 100. The messaging platform 105 may be configured to send and receive image files representing ideograms or certain text strings corresponding to certain ideograms, and to display them to the author and recipient as an ideogram 121A within the message field 120A.

FIG. 1B shows an example embodiment wherein the user authoring a message 122 may insert one or more ideograms 121B into the body of the text message being sent. The messaging system may contain an auto-correcting system where the text message field automatically converts certain text strings 125 into ideograms. This may occur through a standard such as Unicode. The author may select certain emoji to convey a message consistent with or supplementing the text content of the message 122. Ideograms may be placed at any position within the message, such as, by way of example and not limitation, the beginning, middle, or end of a text message. Alternatively, the author may choose to send a message containing only one or more ideograms, without accompanying text.

FIG. 1C depicts an example embodiment where the author of a message may be presented with a "sticker pack" window 130 of ideograms 135 to be sent in the message. The sticker pack 130 may be displayed to the author for selection of one or more ideograms 135. The sticker pack 130 may be displayed based on user input, e.g. if the user inputs a hashtag symbol, #, or by selection of a dedicated button 137 on the messaging platform. A sticker pack 130 may consist of one or more ideograms 135 that has been classified into a particular group 131. The author may select a particular group from the category tabs 132A-C, and the sticker pack window 130 displays the selected group of ideograms. For example, ideograms depicting a particular artistic theme or character (such as Happy Poo or Cute Bunny ideograms) may be grouped together. Other sticker packs may be selected by the author to insert other types of ideograms. The author's device 100 may be preloaded with certain sets of sticker packs 130 for use in messaging; the author may also be presented with the option to purchase additional sticker packs containing additional ideograms. Alternatively, the messaging system may be configured to present the author with the sticker pack of ideograms when certain conditions are met, for example by displaying the sticker packs at the end of each sentence.

Figures 2A, 2B:
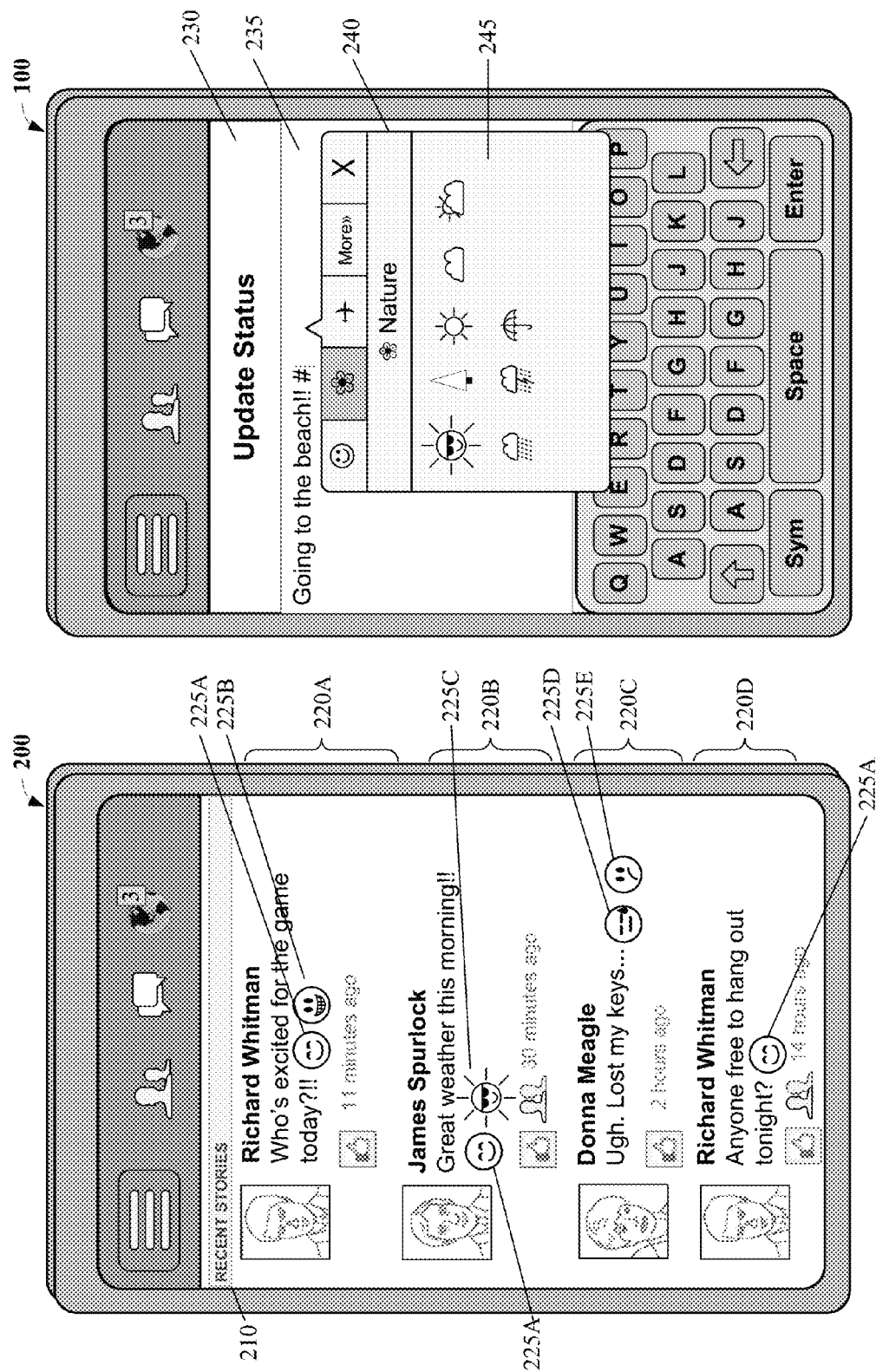
FIG. 2A illustrates a mobile device with a social network newsfeed displaying status update messages from other users that contain ideograms within the status updates.
FIG. 2B illustrates a mobile device displaying a status update user interface, where the user may insert ideograms into a text status update.

FIG. 2A depicts the use of ideograms in status messages in a social network news feed 210. A receiving device 200 receives status messages sent by the recipient's friends and acquaintances, and presents the status messages in a news feed to the recipient. The news feed contains one or more posts from other users, 220A-D. The status updates may also contain ideograms 225A-E contained within the body text of the status updates. The recipient may choose to comment on the status update, and may insert ideograms into the body of the comments.

FIG. 2B depicts a user status update screen 230 for a social network, wherein the author may input a status or message 235 to be sent to one or more other social network users. The group of users which may see the status update may be configured by the author. The status update input field may receive text, images, or video input by the author to post as a status update. The status update input field 235 may also be configured to present the author with the option of inserting ideograms 245. In FIG. 2B, a particular embodiment may present the option of inserting ideograms to the author in a sticker pack format 240.

FIG. 2C depicts an interface of a social network that allows a recipient to sort status updates in a news feed by the ideograms contained within each status update. For example, the recipient may select any ideogram from the category tabs 250A-C. The ideograms displayed in the category tab may be selected based upon actual use of the ideograms by others in the social network; i.e. by displaying the ideograms in order of popular use. Alternatively, the news feed may display only category tabs for ideograms that the recipient has explicitly selected to be placed on the category tabs (e.g. if the recipient does not wish to see status updates sorted by a sad emoticon, they could remove that option from the category tabs 250A-C).

When the recipient selects a particular ideogram 225A from the category tab 250A, the list of status updates in the news feed 210 may be refreshed to contain only messages containing the particular ideogram selected. For example, in FIG. 2C, the recipient has selected the tab 250A containing an ideogram of a smiling face. The list of status updates below has filtered out messages that do not contain the same ideogram, and has listed only messages with the same ideogram.

The selection of a particular ideogram may be configured to show messages or status updates that contain only that particular ideogram, or messages or status updates that can contain other status updates so long as the selected ideogram is also included. For example, status updates 220A and 220B both display the selected ideogram of a smiling face, but also contain other ideograms. A particular embodiment may filter those status updates out of the list as well, and only list status update 220D which contains only the selected ideogram. In another embodiment, the news feed may include status updates 220A and 220B in addition to 220D.

FIG. 2D depicts an example embodiment where the recipient may view a list of ideograms 225 by a configured filter. The filter for display may be the ideograms' popularity in use by other users of the social network. The list of ideograms may be sorted by their popularity for all-time, or over a certain subset of time, such as a particular month or year. One embodiment may list the most popular ideograms over a subset of time dating to the present, such as the previous 7 or 30 days. This type of filtering, which may display the most popular ideograms over the most recent period of time, may be called "trending". The recipient may view the list of ideograms 265A-E under the particular filter 260, and view who if any friends or acquaintances have used that particular ideogram. Upon selection of one of the ideograms 265A-E in the list, the recipient may be directed to a list of the actual status updates using each ideogram, similar to the interface in FIG. 2C.

Figure 3:
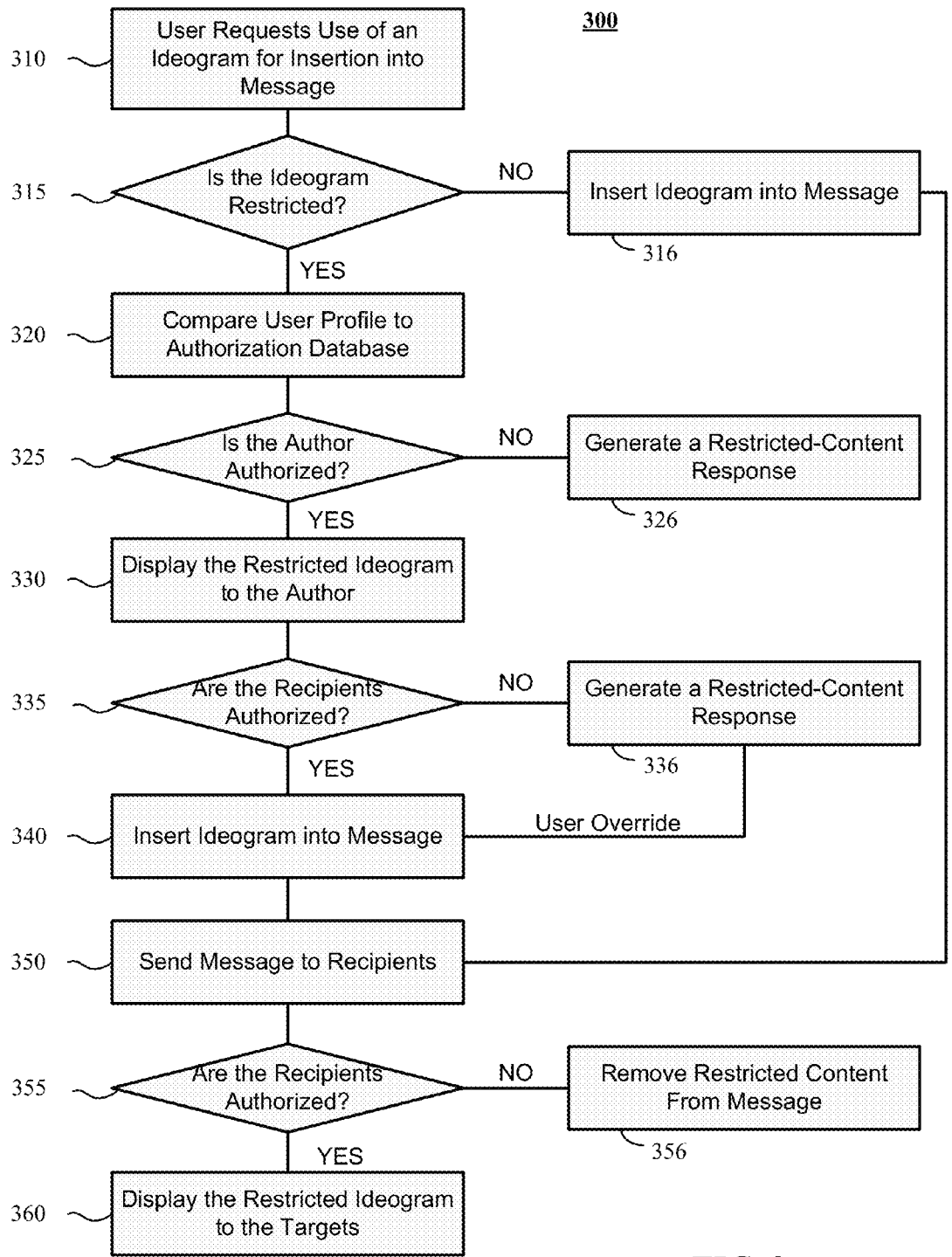
FIG. 3 illustrates an example method of restricting access to use or viewing of particular ideograms that require user authorization.

FIG. 3 illustrates an example method 300 for providing ideograms into a message wherein the ideograms may be restricted in use or in viewing by a recipient. An ideogram may be restricted only in use; that is, an unauthorized author may be prevented from inserting a restricted ideogram into a message. An ideogram may be additionally restricted in viewership, where if a recipient is not an authorized user of the ideogram, he or she may be restricted from even viewing the ideogram. Determination of who is authorized to use or view a particular ideogram or set of ideograms may be based on conditions set by the author, or by another entity. Restrictions to access to certain ideograms may include membership in a certain group. Groups determining authorization may consist of, for example: members of a certain social club; people who have purchased access rights to the particular ideogram or set of ideograms; direct connection to a particular user node or concept node of a social network; people with phone numbers with a certain area code or prefix; or people who are registered users of a downloaded app on their mobile device. Restrictions to access may further be based on user-specific information including a demographic attribute of the user (such as age, sex, gender, nationality, racial identification), a profile attribute of the user on the messaging platform or social networking system, a status of the user (e.g. the device is in "pairing mode" or "game mode"), parental controls set for the user's account, or a transaction history of the user. Transaction history requirements may include requiring that users have played more than a preset number of games on a social-networking system, have attained a certain level within a game or have played a game more than a certain number of hours, have posted a certain number of comments or status updates, or are designated as administrators or officers of an organization.

At step 310, ideograms may be selected for insertion into a message or as a standalone message. Examples of messages are a text message using a messaging platform to be sent to one or more recipients, or a posted status update of the author's profile on a social-networking system. The example method of FIG. 3 will embody a messaging platform.

At step 315, the messaging platform determines whether the ideogram selected by the author is restricted. If the author selects an ideogram with no restrictions, the ideogram may be inserted into the message as soon as the author selects it, step 316. Upon selection of an ideogram with restricted access, a request for authorization to access the restricted ideogram may be sent by the author's device.

At step 320, the messaging platform compares the author's user profile to a database of authorized users. An example method of this step may be for a messaging platform on a social-networking system to connect to a server of the social-networking system to access a centralized database. Another example method may be for the authorization database to be stored locally on the author's computing device.

At step 325, the messaging platform may determine whether the author is authorized to access the restricted ideogram. Determination of authorization may be based on whether the request for access comprises an authorization code or token, e.g. a cookie or SSL certificate.

At step 326, if the author is not authorized, the messaging platform may prevent the ideogram from being inserted, and may display a warning message informing the author that the ideogram is restricted. The author may then choose to abandon insertion of the ideogram, or find a way to gain authorization (e.g. by purchasing the sticker pack containing the restricted ideogram).

At step 330, if the author is an authorized user of the ideogram, the restricted ideogram may be displayed to the author. The messaging platform may additionally determine if the author has determined the recipients who will view this message. The author may choose as recipients one or several individuals, a specific group of individuals, or may be sending the message to a wider group, e.g. a status update that is viewable by any direct connections in a social network.

At step 335, if the author has selected one or more recipients, the messaging platform may determine if the recipients also are authorized users of the restricted ideogram. Determination of authorization for the recipients may be conducted similarly to determination of authorization for the author, as discussed in step 325.

At step 336, if one or more of the selected recipients are not authorized, the messaging platform may display a warning to the author that the ideogram is restricted and that certain recipients may not be able to view the ideogram. The author may then have the option of deleting the ideogram from the message, or overriding the warning and proceeding with the message with the restricted ideogram.

At step 340, if all of the selected recipients are authorized, then the messaging platform may not display a warning and the ideogram will be inserted into the message. The ideogram may be placed at any number of locations within the body of the message, for example at the beginning of the text, the end, or in the middle of the text. The text content of the message may wrap around the ideogram so that both the text and ideogram are easily viewable.

At step 350, after the author has completed the message, he or she may choose to send out the message to the intended one or more recipients. The messaging platform will send the message to the recipient devices, and the recipients will be able to view the message using a compatible messaging system.

At step 355, the messaging platforms on the recipient devices may determine again if the particular recipient is an authorized user of the ideogram. This additional authorization check is used in case the author overrode the restricted-content response when the ideogram was inserted into the message. Determination of authorization may be conducted in the same fashion as described in steps 325 and 335.

At step 356, if the recipient is not authorized to view the ideogram, then the recipient may be able to view the message without the restricted ideogram; i.e. the ideogram will be deleted or redacted from the message. The messaging platform or social network interface may inform the unauthorized recipient of the presence of a restricted ideogram. The recipient may then be presented with potential options for gaining authorization to that ideogram; e.g. by purchasing a sticker pack or by joining a certain group.

At step 360, if the recipients are authorized users of the restricted ideogram, they may view the message exactly as the author sent it, i.e. with the restricted ideograms.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4A:
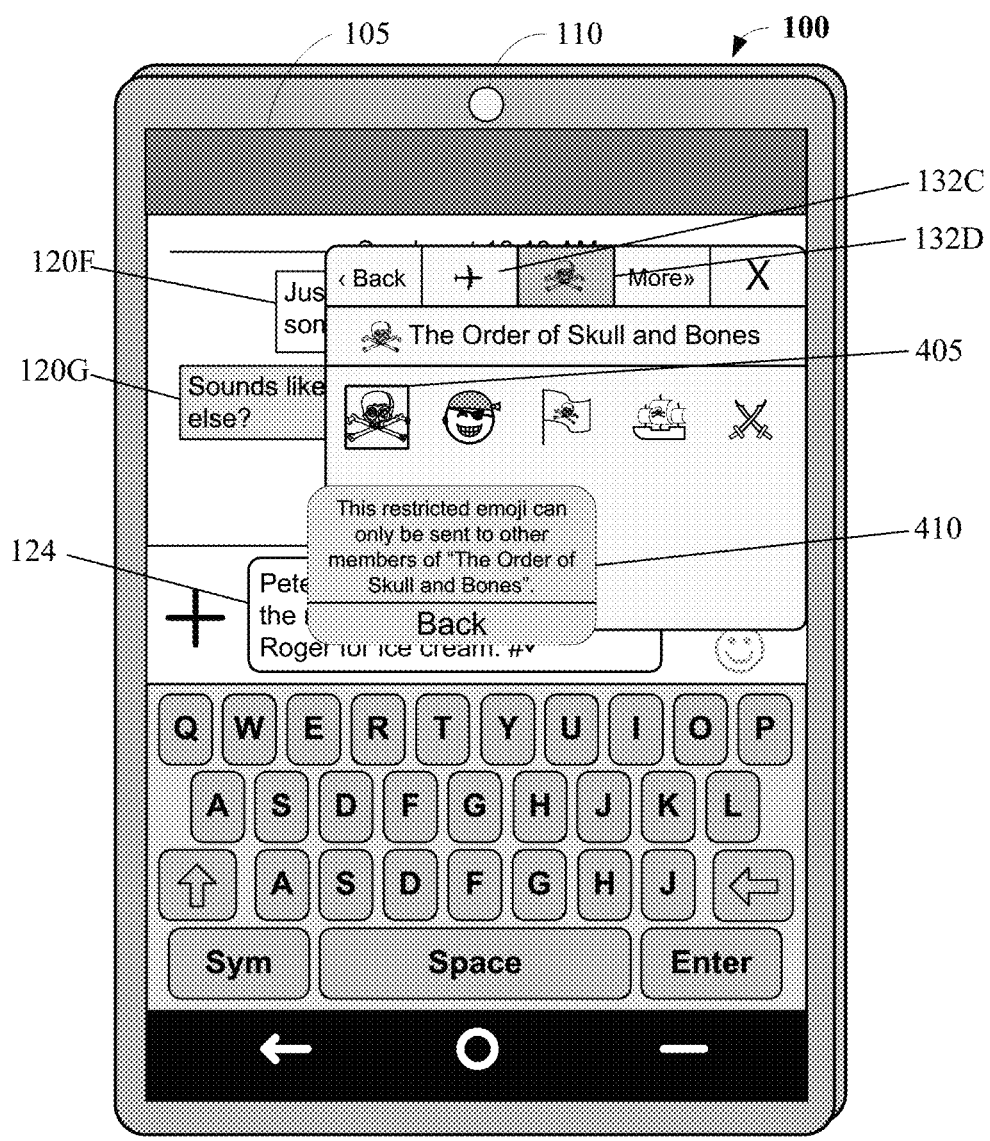
FIG. 4A illustrates a mobile device showing an input text message where the author has attempted to insert a restricted ideogram and the messaging platform displays a warning to the author that the ideogram is restricted.

FIG. 4A depicts restrictions being placed on the user of particular ideograms. In one embodiment, the author may be attempting to insert an ideogram 405 belonging to a particular sticker pack 132D into a text message 124. The ideogram 405 is restricted for use only by authorized users. Unauthorized users may be unable to use the particular ideogram 405 or view the ideogram 405 in messages sent by authorized users. The device may display a warning 410 to the author that the ideogram is restricted. This warning may be sent for all uses of the restricted ideogram, or only if the messaging platform determines that the message is being sent to an unauthorized recipient.

Figure 4B:
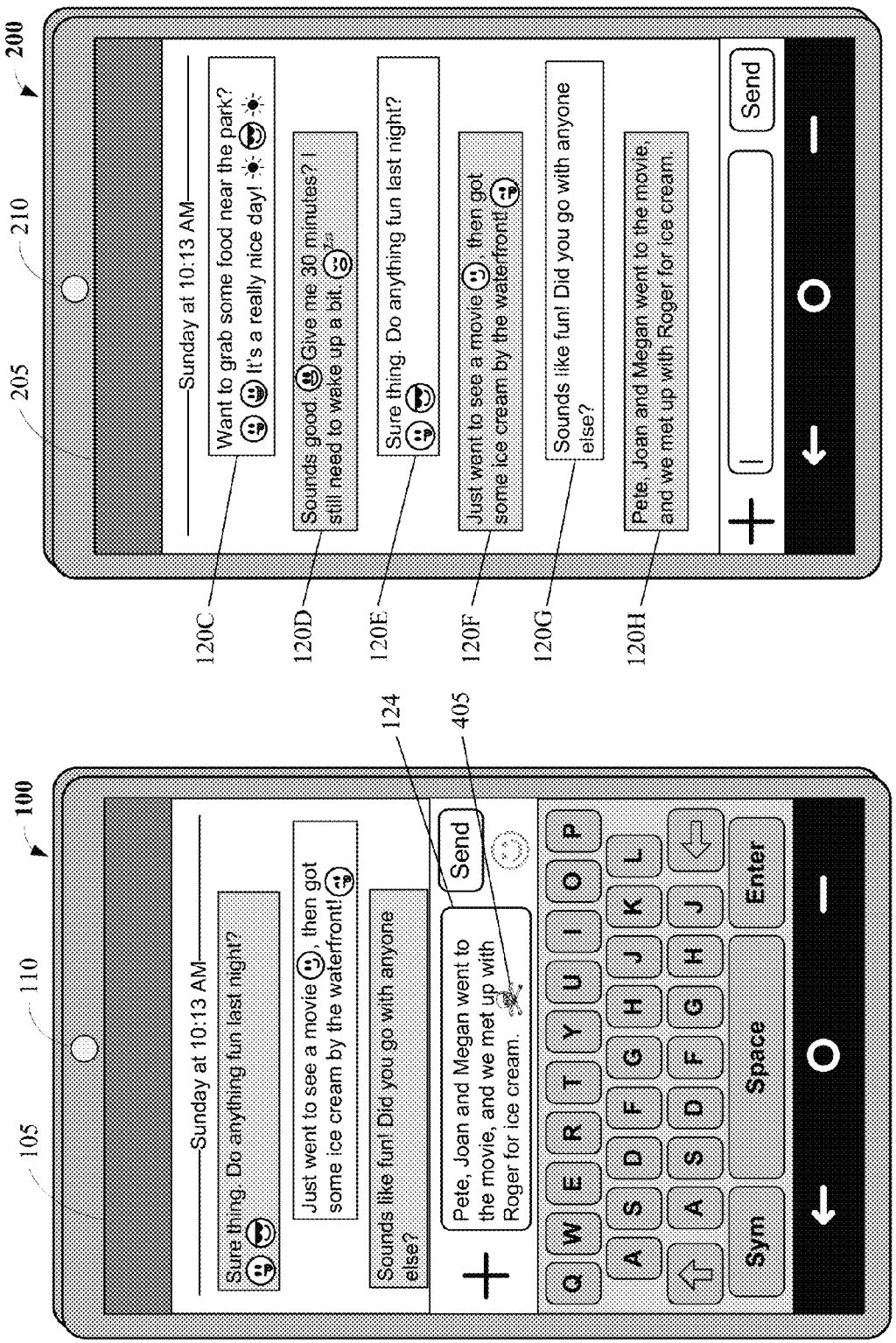
FIG. 4B illustrates a mobile device that has sent a restricted ideogram, and an unauthorized recipient mobile device that displays a text message without the restricted ideogram.

In FIG. 4B, the author has attempted to send a message 124 containing a restricted ideogram 405 to a device 200 belonging to a recipient who is not an authorized user. While the author may be able to input the restricted ideogram 405 into the message 124, when the message 124 is sent to the recipient, the ideogram 405 may have been deleted from the received message 120H. The recipient may see a message 120H containing the rest of the sent message 124 without the restricted ideogram 405.

In particular embodiments, restrictions may serve to block the author from sending particular ideograms or any ideograms at all to a designated recipient. Restrictions may be based on any factors, including but not limited to: attributes of the author and/or the recipient (e.g., age or gender), the type of relationship between the author and the recipient (e.g., manager-employee or mother-son), time of day, location. Such restrictions may be configured by the author, by the recipient, by an entity in control of licensing usage rights to the ideogram, or by a site/system moderator.

Figure 5:
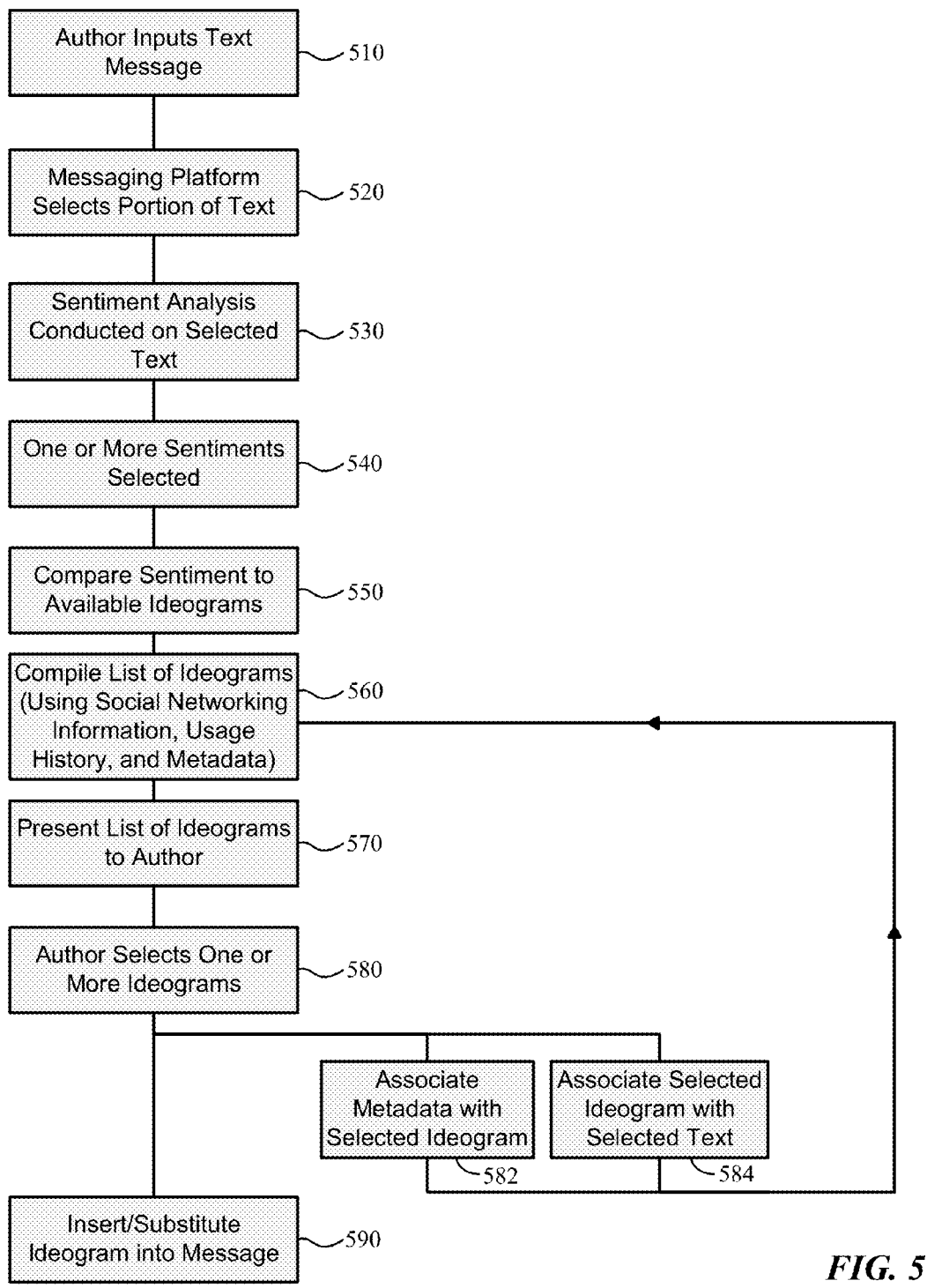
FIG. 5 illustrates an example method for suggesting ideograms to the author of a message based on sentiment analysis conducted on the text that the author has input.

FIG. 5 illustrates an example method 500 wherein the messaging platform may suggest certain ideograms to the author of a message, based at least partly on the text content that the author has input. In the example method of FIG. 5, the suggestions made by the messaging platform may include sentiment analysis on the text content At step 510, the author may input a text message into a messaging platform. Some text messages may be devoid of any particular attached sentiment, for example a reply of "yes." Many other text messages may contain one or more sentiments in the message.

At step 520, the messaging platform may select at least a part of the input text message. As discussed in step 510 above, for some messages the messaging platform may determine that no part of the text can be selected for analysis. If the messaging platform does select at least a portion of the input message, the messaging platform may proceed to the next step.

At step 530, the messaging platform may conduct sentiment analysis on the selected text. Particular embodiments may incorporate any methodology of performing sentiment analysis upon a word, phrase, or other body of text (which may or may not include ideograms), including by way of example and not limitation: polarity classification, sentiment classification according to a pre-defined set of emotional states, subjectivity/objectivity identification, or feature/aspect-based sentiment analysis. Sentiment analysis may be based upon, not just words, punctuation, and ideogram usage, but also other indicia, such as, by way of example and not limitation: (1) analysis of audio including a voice to detect volume, tone, and/or inflection, (2) analysis of video to perform facial/gesture recognition and emotion detection, and/or (3) analysis of biometric sensor data to detect pulse, temperature, skin conductance, pressure and/or speed while typing/clicking on a touchscreen, and/or pupil constriction/dilation. At step 540, a messaging platform may identify one or more sentiments to be associated with the input text.

At step 550, the messaging platform may then compare the available ideograms to the identified one or more sentiments to suggest at least one ideogram to the author of the input message. Factors incorporated into the sentiment analysis may include, by way of example and not limitation: social networking information associated with the author of the message, information associated with the social networking connection between the author and one or more recipients of the message, membership of the author or recipient in a group authorized to use a restricted ideogram, an ideogram usage history for the author of the message, or an ideogram usage history for other users of the social network system. In particular embodiments, methods for performing sentiment analysis may also include not just such information associated with the author or recipient(s) of a message, but also similar information associated with a "target" of a message: a person or concept mentioned in the message. In one embodiment, the messaging platform may have indexed records in a database associating certain ideograms to a sentiment. The indexed records may be user-specific; each author may have different indices for various sentiments and ideograms. Upon identification of at least one sentiment, the messaging platform may display the ideograms that are contained in the indexed record for that sentiment, and present them to the author for selection.

Ideogram usage history for the author may be determined by considering the results of previous suggestions to the author; that is, if the author accepted a suggested ideogram in a similar situation, manually selected a different ideogram, or rejected the suggestion to include an ideogram. Ideogram usage history may be further categorized based on additional factors. For example, ideogram usage histories may be created for the author at different timeslots in the day (e.g. a history for messages sent between 10 pm and 3 am), for messages sent within a calendar range (e.g. a history of ideograms sent in the past year), for messages sent to particular recipients, for the current location of the author, or the current location of the identified recipient. These factors and others may be used in sentiment analysis to generate different suggestions for the author at different times, locations, or for different recipients.

The ideogram usage history for other users in a social-networking system may be further categorized. Additional factors to create subsets of users may include users matching the author's demographic or location profile, users within a certain degree of separation from the author in the social network graph, users who have previously or recently communicated with the author, users who have previously or recently communicated frequently with the author, or users associated to a certain group which the author has designated or to which the author is also associated.

The indexed records of ideogram associations to a sentiment may be created by the messaging platform provider, or a social network server. An ideogram may be associated with one or more sentiments, and conversely a sentiment may be associated with one or more ideograms. The determination of associating an ideogram with a sentiment, as described above, may be quantified with a "score" of how well an ideogram is associated with a sentiment based on the factors discussed above. The scores may be defined as a division between two or more sentiments; e.g. a particular ideogram may be scored as 30% angry, 70% sad.

At step 560, the messaging platform may generate a list of ideograms to suggest to the author at step 570, sorted by the score of each ideogram or by only displaying ideograms that are above a certain score. If the scores are a percentage split between two or more sentiments, the messaging platform may pick ideograms with the sentiment score within a certain tolerance threshold, e.g. by picking an ideogram with a score within ±10% of the desired score for that sentiment. Furthermore, the messaging system may exclude ideograms that meet the predetermined score requirement, but is also associated with a second sentiment that the messaging platform or author has determined undesirable to be mixed with the present sentiment.

At step 584, the scores may be updated through usage statistics collected by the messaging platform. For example, if a particular ideogram is selected a majority of the time for a particular sentiment by authors in a particular group or social network, then the messaging platform may score that ideogram higher in its association with the sentiment, and present it first in the list of suggestions to future authors with the same sentiment. If the authors are manually picking an ideogram not currently on the list of suggested ideograms, the messaging platform may update the list to include the new ideogram. Conversely, if an ideogram is not popular with authors for a particular sentiment, that ideogram may be placed farther down the list of suggestions, or dropped altogether from the suggestions.

At step 582, ideograms may also be associated with metadata pertaining to that particular ideogram. Metadata to be associated with ideograms may include descriptive text for the ideogram, text input by the author for which the ideogram was substituted or added, or other data that is associated with the author's use of that particular ideogram. The messaging platform may create the indexed records for sentiments and ideograms by including the metadata associated with each ideogram when generating the scores for each sentiment-ideogram association.

At step 580, the author will select one or more of the ideograms to be inserted into the message at step 590, substituting the analyzed text or being inserted into the text message without any deletions to the text.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6A:
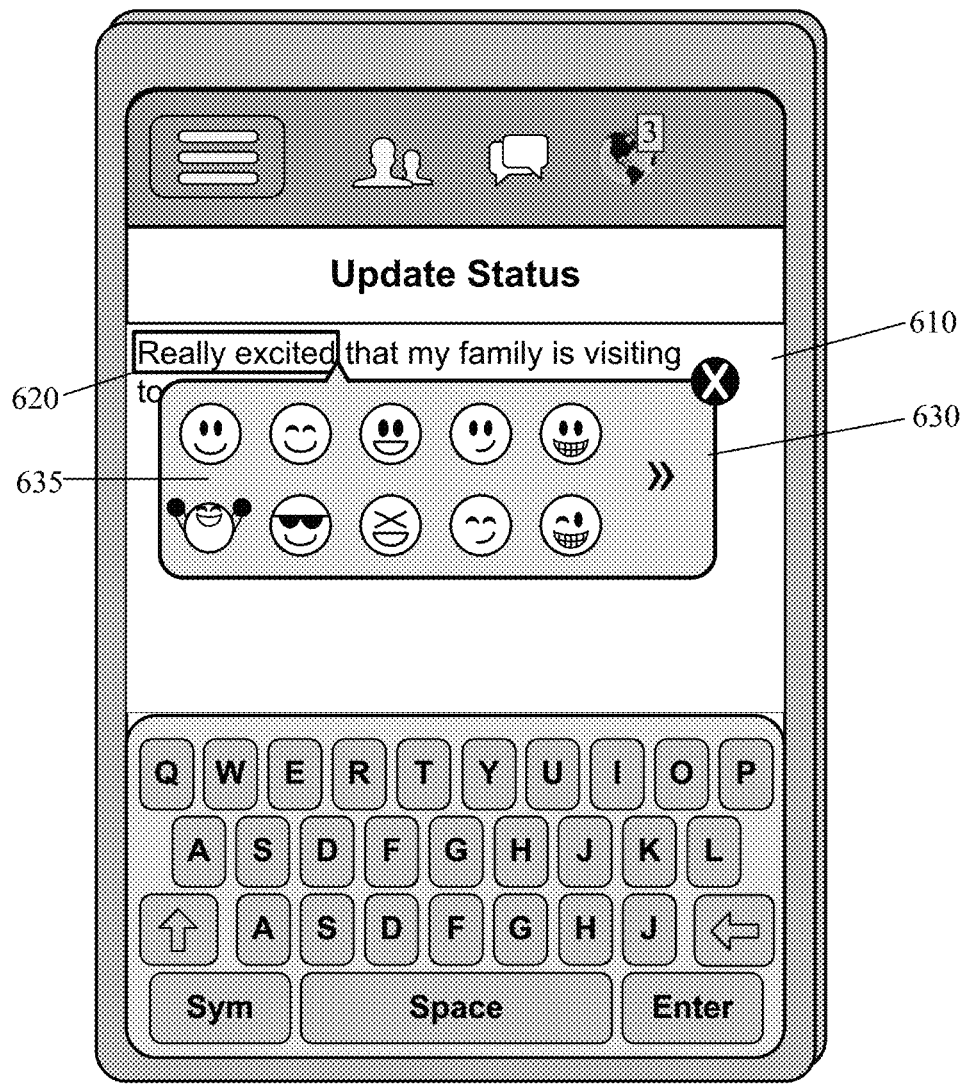
FIG. 6A illustrates a mobile device with a pop-up list of ideograms that are suggested to the author based on sentiment analysis of the highlighted portion of text.

FIG. 6A depicts an embodiment of sentiment analysis on a portion of input text 620 to suggest a set of ideograms 630 to the author. Ideograms may be arranged on an emotional range; for example, by arranging them in the following order: worried, anxious, frantic, angry, furious, upset, annoyed. Alternatively, ideograms may be arranged depending on their score or percentage score for the particular sentiment or emotion that is being represented. The messaging platform may perform sentiment analysis on a part of the author's text 620. The analysis may then find the appropriate sentiments that the author is trying to express, based on methods described above. The messaging platform may then display a pop-up menu to the author, highlight the analyzed text, and display on the menu a list of ideograms that correspond to the sentiment. The author may then choose an ideogram 635 from the list, scroll further down the list, have the messaging platform conduct a new sentiment analysis, or cancel out of the pop-up menu. If the author chooses to select and insert an ideogram from the displayed pop-up menu, the author may have the additional option of substituting the ideogram for the highlighted text 620, or adding the ideogram into the unaltered text 610. Therefore, the ideogram selected by sentiment analysis may either replace or supplement the text 620 upon which the analysis was performed.

Figure 6B:
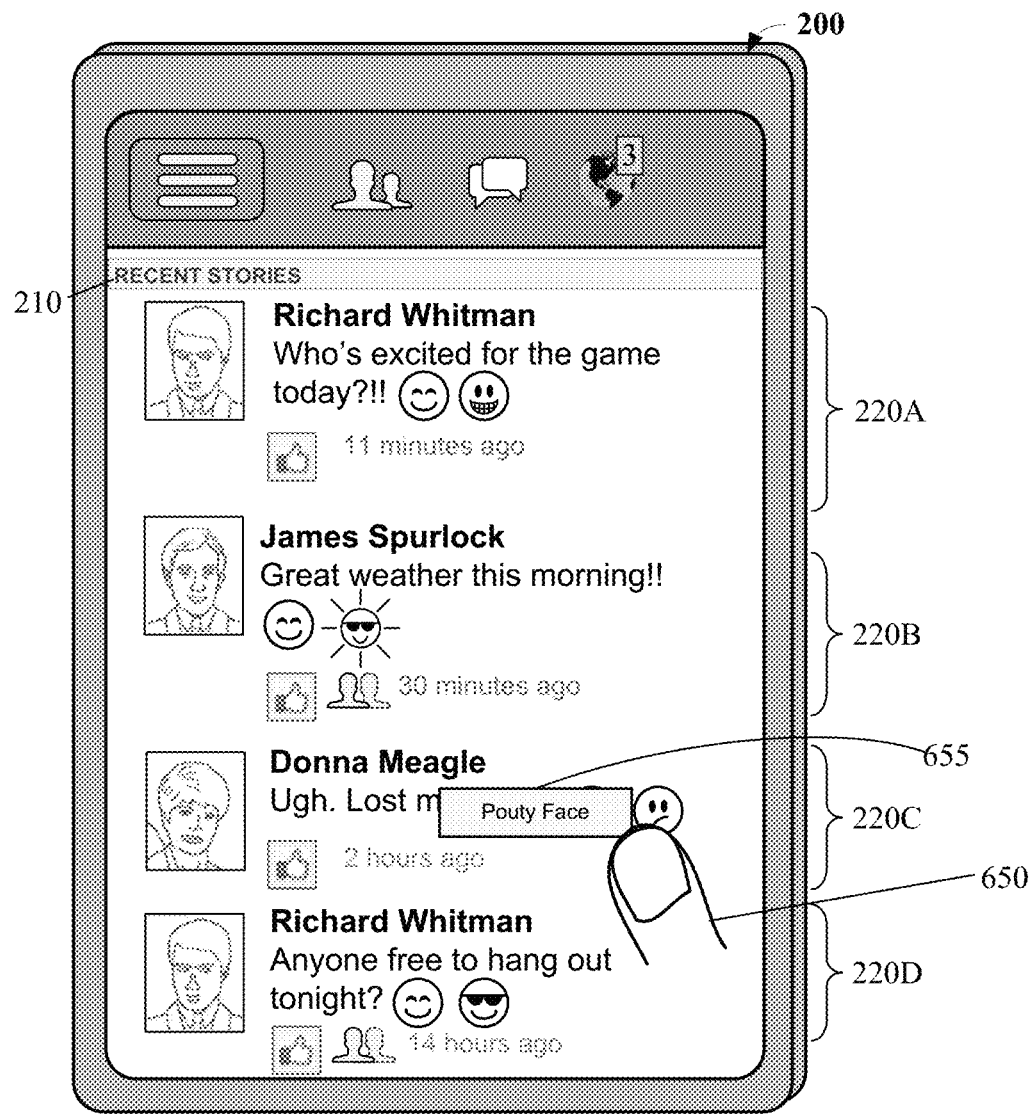
FIG. 6B illustrates a mobile device with a social network newsfeed displaying status update messages from other users that include ideograms, with text descriptions of an ideogram appearing on the display when the ideogram is tapped.

FIG. 6B depicts a mobile device 200 showing a newsfeed 210 of status updates 220A-D by users of a social network. The status updates may incorporate ideograms within the text of the update, as seen above. When a recipient viewing the update has any confusion about a particular ideogram displayed, he or she may select the ideogram, for example with a tap 650 on the screen of the mobile device. The newsfeed may then display to the recipient a text box 655 containing a text description of the ideogram.

The recipient or another user may interact with the displayed ideogram further. For example, the recipient may perform a double-tap, tap-and-hold, or other interaction with the ideogram, which may cause the messaging platform or social network interface to present options such as viewing the popularity of the ideogram in the social network, refreshing a newsfeed to show status updates utilizing that ideogram, or informing the recipient how he or she may gain authorization to use it.

Figure 6C:
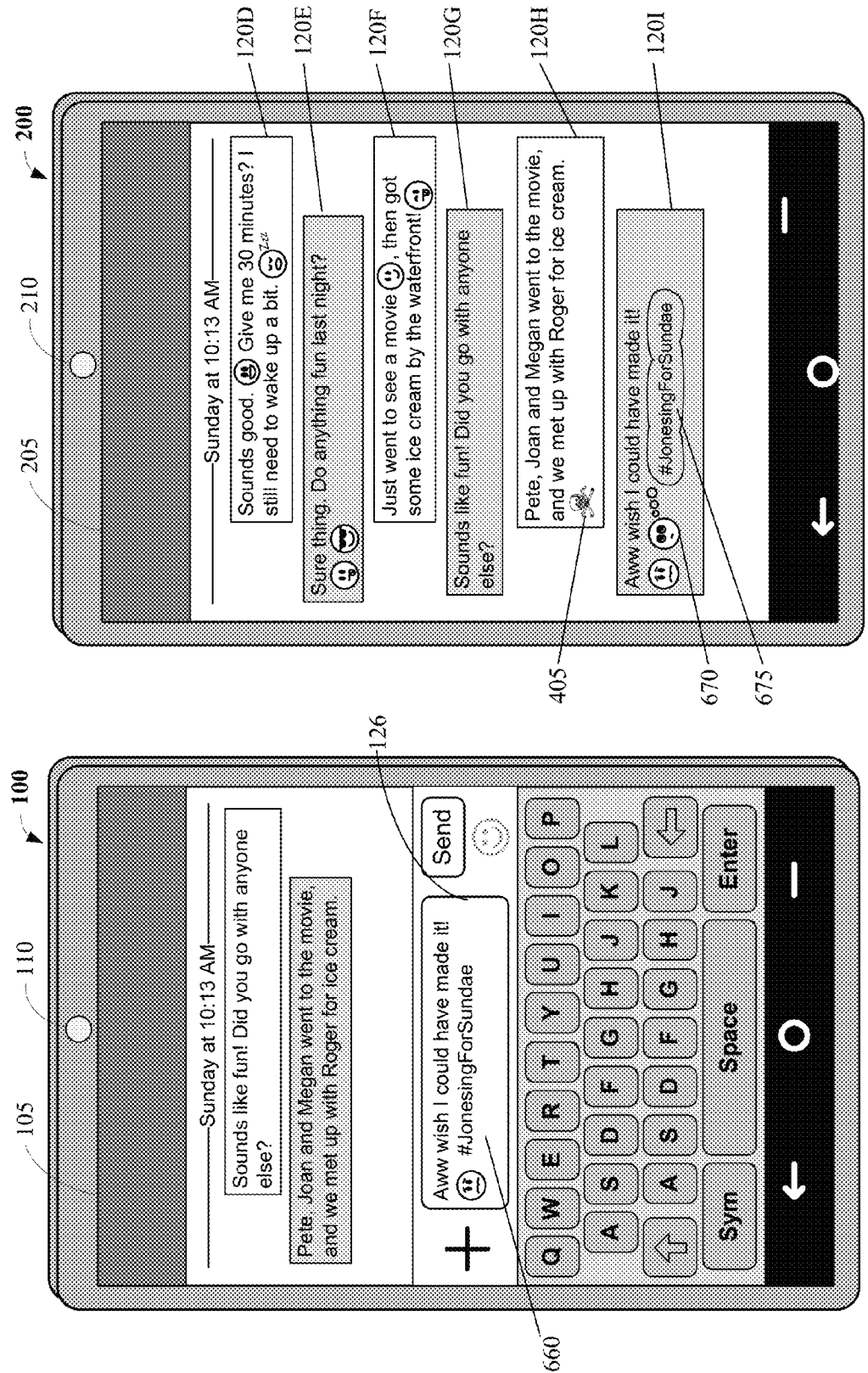
FIG. 6C illustrates a mobile device with a text message containing a hashtagged text phrase, and a recipient mobile device that has incorporated the hashtagged text phrase into an ideogram.

FIG. 6C depicts an embodiment wherein the messaging platform selects an ideogram 670 that incorporates a text input by the author. The author writes in a text message 126, and may designate a certain word or phrase 660 to be incorporated into the ideogram. The word or phrase may be designated, for example, by prefacing it with a hashtag symbol, #, or another character; the author may also type out the designated word or phrase, highlight or tap on the word or phrase, and push a button on the messaging platform that causes the platform to create an ideogram incorporating the word or phrase. In a particular embodiment, the ideogram 670 may be a face accompanied by a thought or speech bubble 675; the selected text 660 may then be displayed in a message 120I to the recipient within the thought or speech bubble 675. The author may be presented with options to alter the appearance of the ideogram; e.g. by changing the expression on the ideogram face, or switching between a thought bubble and a speech bubble.

Figure 7:
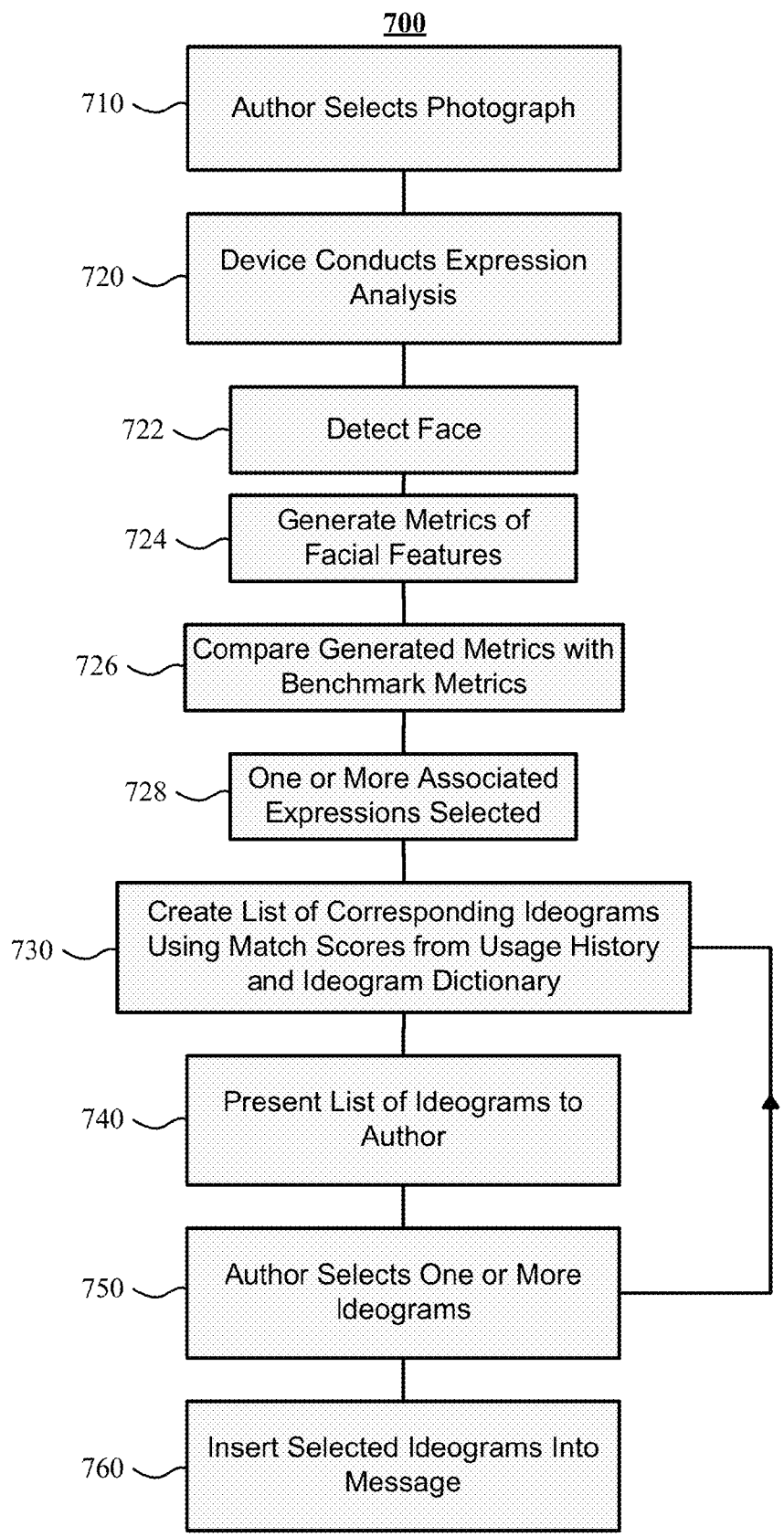
FIG. 7 illustrates an example method for suggesting ideograms to the author of a message based on expression analysis conducted on a captured image including a person's face.

FIG. 7 illustrates an example method 700 for suggesting ideograms to the author of a message based on an expression captured by a camera associated with the computing device. An expression may be defined as a facial expression associated with an emotion, a facial expression that has a semantic association (which may not necessarily have a particular associated emotion, such as a wink), a hand gesture (in combination with a facial expression or taken alone), or some other gesture that may be visually captured.

Figure 8A:
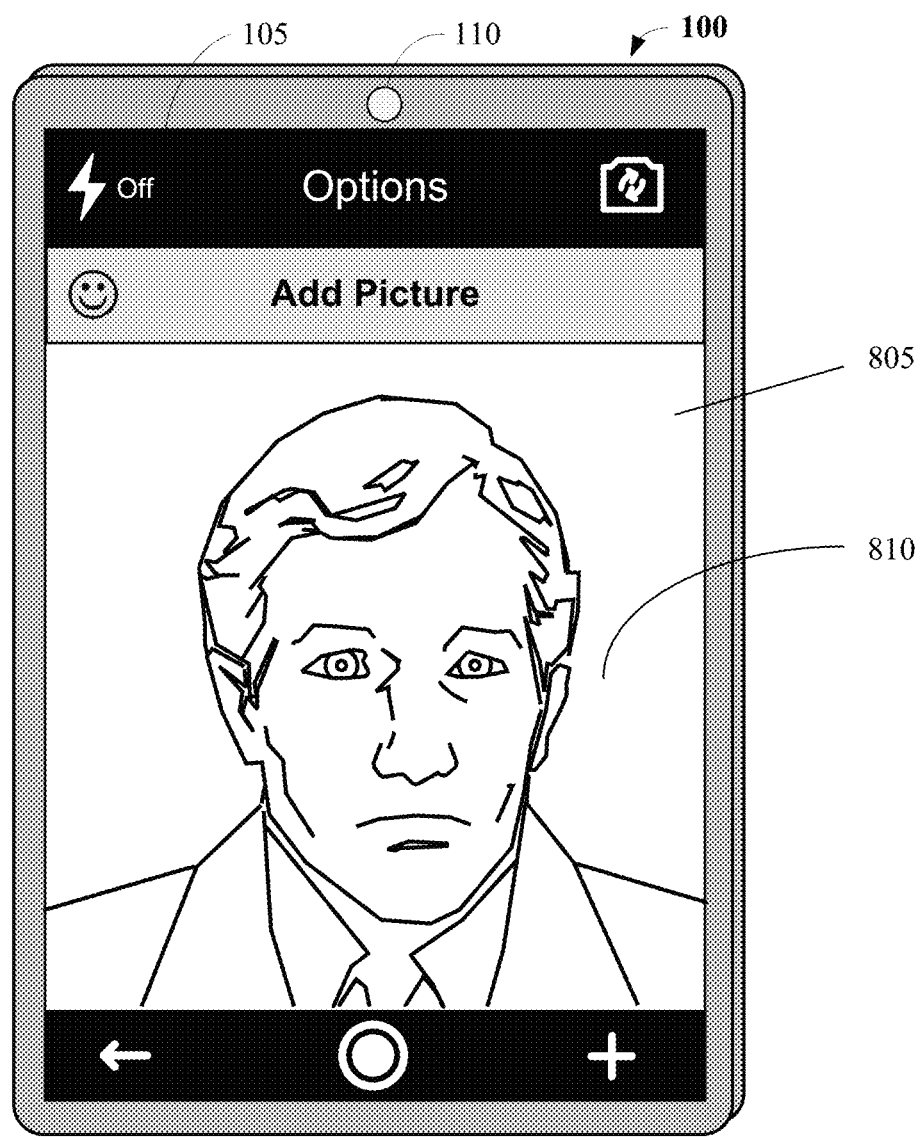
FIG. 8A illustrates a mobile device showing a front-facing camera view of the user of the mobile device.
Figure 8B:
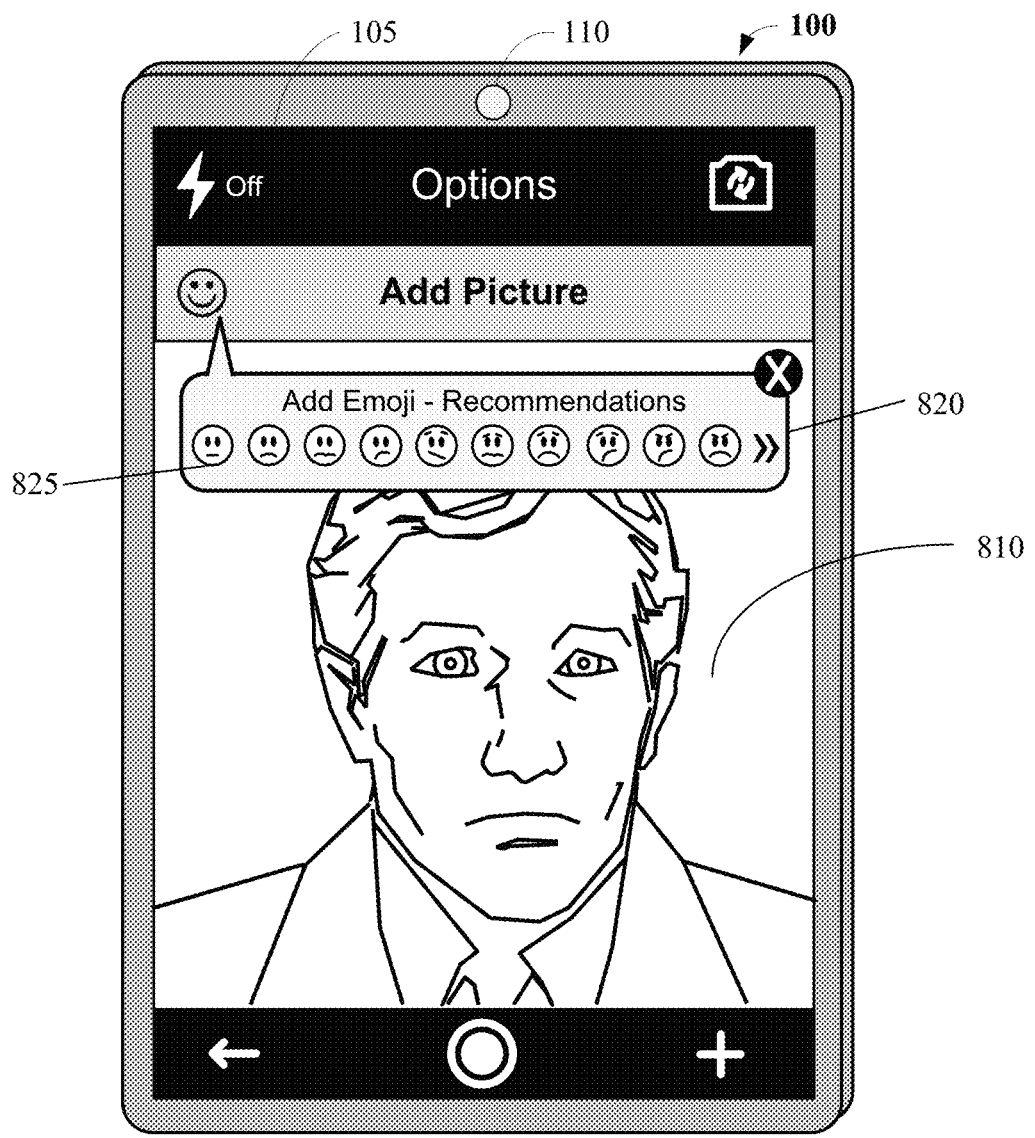
FIG. 8B illustrates a mobile device presenting the user with a list of ideograms based on the expression analysis conducted on the captured image.
Figure 8C:
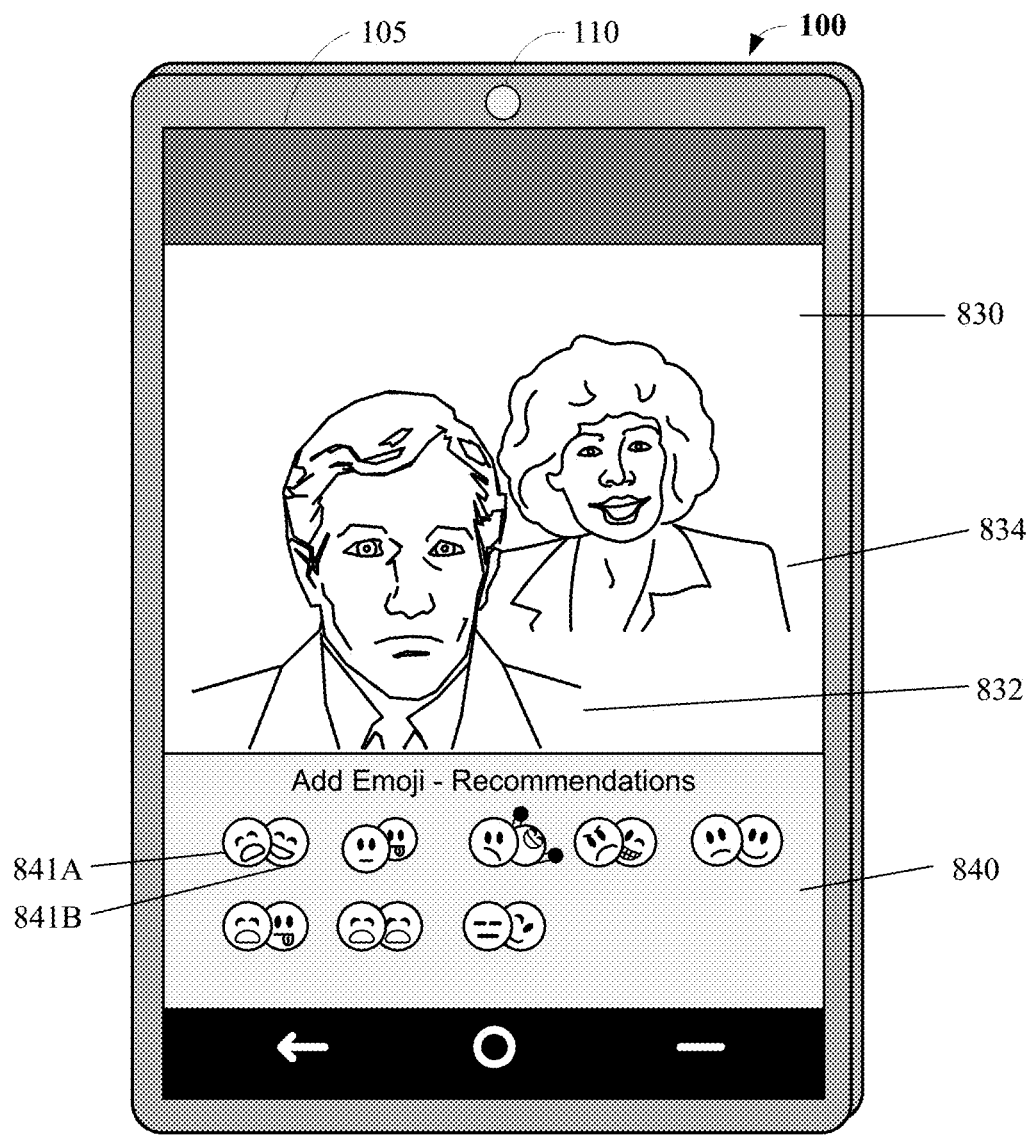
FIG. 8C illustrates a mobile device presenting the user with a list of ideograms based on the expression analysis conducted on two subjects in a captured image.

At step 710, a camera application on the computing device may capture an image using an associated camera wherein one or more people are included. The associated camera may be integrated into the computing device, as shown in FIGS. 8A-8C (i.e., camera 110), or it may be communicably connected to the computing device (e.g., a local webcam connected by a USB cable, or a remote security camera connected via a network connection). FIG. 8A depicts an example embodiment of a mobile device 100 with a front-facing camera 110 adjacent to a front display 105. In such a device 100, the camera application may utilize the front-facing camera 110 to show the user a "self-portrait" view 805, where the user may easily see the image being captured on the front display of the mobile device. This captured image 810 may be a single image, a set of images (e.g., taken using a high-speed camera), or a video clip or stream. The captured image may be stored on mobile device 100, streamed from mobile device 100, uploaded to a server, or inserted into a message to be sent to one or more recipients. In other embodiments, the image may be captured while the camera displays a "live" feed on the display of mobile device 100 (i.e., without taking a photo or shooting a video, or immediately prior to taking a photo or shooting a video) or utilized for data extraction and/or further analysis (e.g., calculating facial geometry in order to perform facial recognition or expression analysis).

At steps 720-728, the computing device or messaging platform may analyze the captured image to classify one or more expressions displayed on the face of one or more people shown in the captured image. Analysis of the captured image may take place while the image is being captured, or afterwards (i.e., analysis of a previously-captured image). The expression analysis of the captured image may be conducted by any application operable on the computing device, such as the messaging platform, the camera application, a social-networking system, or another application. The application may additionally be associated with a database containing benchmark metrics for all available expressions, as will be discussed below.

At step 722, the analysis of the faces displayed in the captured image may be conducted by first detecting the presence of one or more faces in the captured image. Facial detection in captured images is a method previously described in the art.

At step 724, the analysis application may then generate a characterization of features of the face. For example, the application may extract certain features or structures of the face by taking the dimensions or relative positions of certain features or structures. The analysis could also factor in skin texture analysis or a three-dimensional facial recognition analysis. The methods for facial recognition where the various dimensions and characteristics of facial features and structures are used to identify an individual are well-known in the art. The analysis may be configured to only proceed with the next step if the identified face is that of the author or another person for whom the application has benchmark metrics (for example, another user on a social-networking system).

The analysis of the face shown in the captured image may then generate quantified or qualified metrics or attributes of features, such as, for example, shape, dimensions, texture, luminance, or color. For example, the analysis may generate metrics representing that the depicted eyes are at a certain angle and relative width, that the skin of the depicted face is pale or flushed, or that the depicted mouth is "upturned" or "downturned."

At step 726, the generated metrics may then be compared to benchmark metrics stored in the database within the analysis application. Benchmark metrics may be defined as the numerical or comparative metrics that correspond to a particular expression. The application may compare the generated metrics for the captured image with the benchmark metrics corresponding to all the expressions stored by the application. The application may then select one or more expressions that are associated with benchmark metrics that correspond closely to the generated metrics, and characterize the face in the captured image as having those one or more expressions. Benchmark metrics may be associated with each individual user, where each identified user is associated with a different set of benchmark metrics. This means that two different users could have very similar generated metrics, but have different expressions associated with the generated metrics due to the differences in the benchmark metrics used.

The benchmark metrics may be generated by one of several methods. For example, the benchmark metrics may be user-specific. In an example embodiment, the user may be asked at a prior time to display a particular expression or no expression, and the device may capture images of the user for each displayed expression. The application may analyze these prior images to generate metrics for each image.

At step 728, the application may then use the metrics generated for each image as the benchmark metrics for the expression corresponding to that image. Benchmarks may also be created based on a group of subjects, for example by a sampling of images of a population of users associated with a particular demographic profile, by a sampling of images of one or more users identified as family members of the user, or by a sampling of images of users associated with the user with respect to a social network.

At step 730, the ideograms that are usable by the messaging platform may be associated with match scores that gives each ideogram a score for a particular expression. An ideogram may be assigned match scores to one or more expressions, and an expression may be associated with one or more match scores, each corresponding to an ideogram. Once the messaging platform has identified a particular expression displayed by a subject in the analyzed photo, the platform may select one or more ideograms that are matched within a certain tolerance level, for example a match score above 60% of the maximum possible score.

The match scores associating an ideogram to a particular expression may be calculated using a variety of factors. A generalized match score could be assigned using an ideogram dictionary, where the messaging platform provider or another third party has assigned match scores to each ideogram. The dictionary may have preset match scores for each ideogram that may be subsequently edited by the user. The messaging platform may also take into consideration the ideogram usage history of the author. For example, if the author previously took an image of himself or herself that the expression analysis characterized as "sad" and the author selected a "pouty" ideogram, then the "pouty" ideogram may have its match score increased for "sad", and the next time the author takes a self-portrait that is characterized as "sad", the "pouty" ideogram will be presented higher on the presented list of ideograms. Both the ideogram dictionary and ideogram usage history may be associated only with the individual user, and may be updated only based on the user's interactions with the ideogram match scores. Alternatively, the ideogram dictionary and usage history could be associated with one or more social-networking connections of the user, associated with one or more users sharing common attributes with the user (e.g. demographics, common interests, etc.), or based on general statistics regarding trending ideograms in a social-networking system.

At step 740, the messaging platform may then present the one or more selected ideograms to the author of the message, for example in a list or a discrete sticker pack category alongside other sticker pack categories discussed above. FIG. 8B depicts the mobile device with a front-facing camera 110 and captured image 810 of the author. The messaging platform using captured image 810 has conducted an expression analysis of the captured image, characterized an expression for the author's face in the captured image, and presented the author with a list of ideograms 820 that have high match scores to that expression. The list or sticker pack of ideograms may be arranged with the ideograms 825 having the highest match scores first, down to the lowest-scoring ideograms that still exceed the tolerance threshold. In some embodiments, the above-described steps (e.g., image capture, expression analysis, and ideogram matching) may be performed prior to taking a photo or video.

FIG. 8C depicts a particular embodiment wherein captured image 830 selected has more than one subject 832 and 834. The mobile device 100 or messaging platform 101 may recognize that captured image 830 has one or more subjects, and accordingly present a list of ideograms 840 to the author that depict one or more expressive ideograms 841. In the example embodiment of FIG. 8C, the messaging platform may conduct expression analysis and recognize that the foreground subject 832 of captured image 830 has a sad or somber expression, while the background subject 834 has an amused or happy expression. Accordingly, the ideograms that are recommended for selection by the author may have two faces, with the foreground ideogram 841A having a sad expression and the background ideogram 841B having a happier expression.

At step 750, upon presentation of the one or more suggested ideograms, the author may select one or more of the ideograms, and at step 760, insert the selected one or more ideograms into a message to be sent to one or more recipients. Alternatively, the author may be presented with a user interface to post the selected ideograms for annotation of another content item on a messaging platform or social network. A content item may include text, image, video, audio, or other content posted by the user, another user, or a third party. For example, if another user has posted a photograph on a social network, instead of "liking" the photograph, the author may annotate the photograph with a selected ideogram that is presented to the author using expression analysis. The author may take a self-portrait of himself or herself reacting to the posted photograph, and then select one or more ideograms that are presented to the author after expression analysis.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 9:
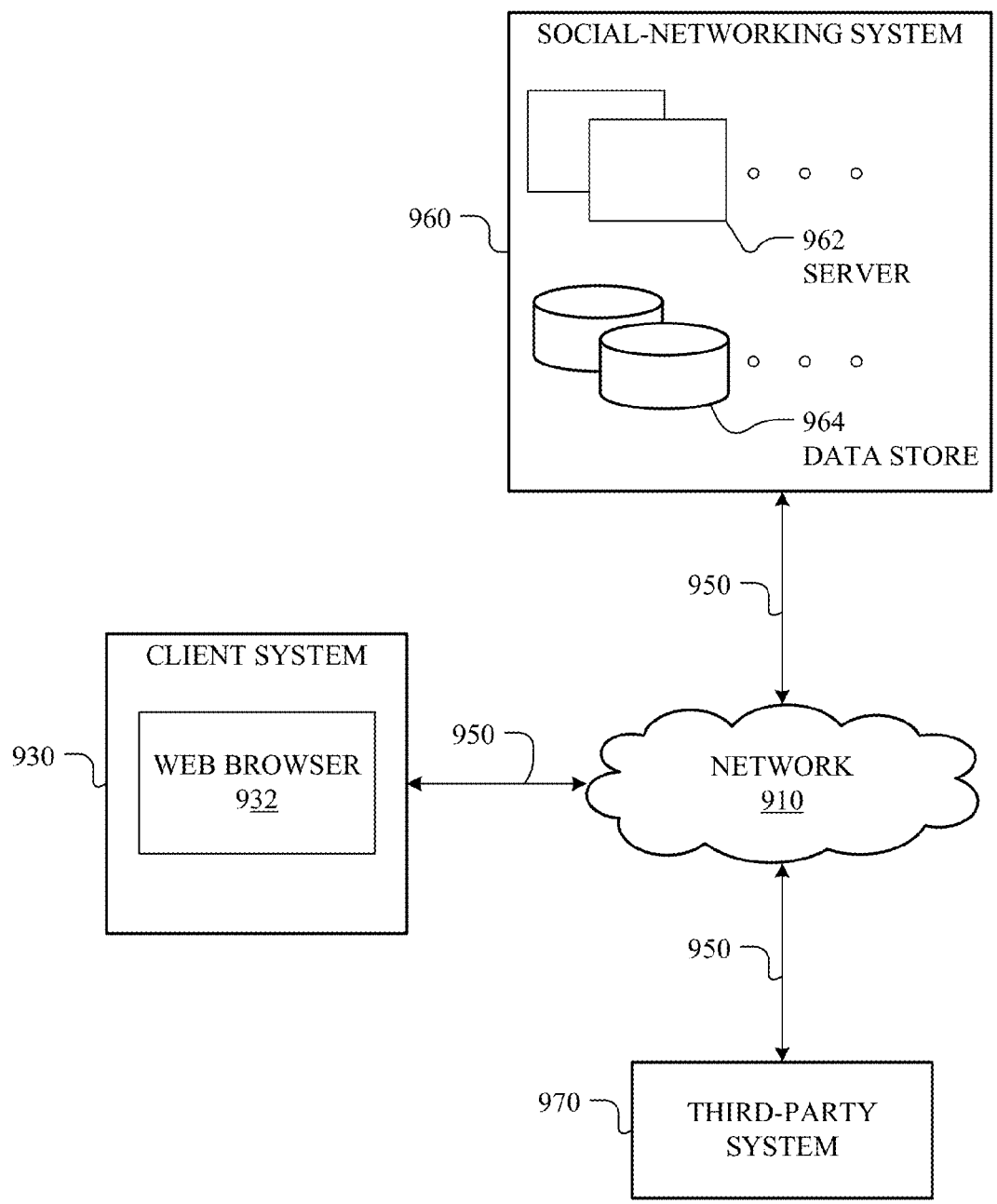
FIG. 9 illustrates an example network environment associated with a social-networking system.

FIG. 9 illustrates an example network environment 900 associated with a social-networking system. Network environment 900 includes a client system 930, a social-networking system 960, and a third-party system 970 connected to each other by a network 910. Although FIG. 9 illustrates a particular arrangement of client system 930, social-networking system 960, third-party system 970, and network 910, this disclosure contemplates any suitable arrangement of client system 930, social-networking system 960, third-party system 970, and network 910. As an example and not by way of limitation, two or more of client system 930, social-networking system 960, and third-party system 970 may be connected to each other directly, bypassing network 910. As another example, two or more of client system 930, social-networking system 960, and third-party system 970 may be physically or logically co-located with each other in whole or in part. Moreover, although FIG. 9 illustrates a particular number of client systems 930, social-networking systems 960, third-party systems 970, and networks 910, this disclosure contemplates any suitable number of client systems 930, social-networking systems 960, third-party systems 970, and networks 910. As an example and not by way of limitation, network environment 900 may include multiple client system 930, social-networking systems 960, third-party systems 970, and networks 910.

This disclosure contemplates any suitable network 910. As an example and not by way of limitation, one or more portions of network 910 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 910 may include one or more networks 910.

Links 950 may connect client system 930, social-networking system 960, and third-party system 970 to communication network 910 or to each other. This disclosure contemplates any suitable links 950. In particular embodiments, one or more links 950 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 950 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 950, or a combination of two or more such links 950. Links 950 need not necessarily be the same throughout network environment 900. One or more first links 950 may differ in one or more respects from one or more second links 950.

In particular embodiments, client system 930 may be an electronic device including hardware, software, or embedded logic components or a combination of two or more such components and capable of carrying out the appropriate functionalities implemented or supported by client system 930. As an example and not by way of limitation, a client system 930 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 930. A client system 930 may enable a network user at client system 930 to access network 910. A client system 930 may enable its user to communicate with other users at other client systems 930.

In particular embodiments, client system 930 may include a web browser 932, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 930 may enter a Uniform Resource Locator (URL) or other address directing the web browser 932 to a particular server (such as server 962, or a server associated with a third-party system 970), and the web browser 932 may generate a Hyper Text Transfer Protocol (HTTP) request and communicate the HTTP request to server. The server may accept the HTTP request and communicate to client system 930 one or more Hyper Text Markup Language (HTML) files responsive to the HTTP request. Client system 930 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 960 may be a network-addressable computing system that can host an online social network. Social-networking system 960 may generate, store, receive, and send social-networking data, such as, for example, user-profile data, concept-profile data, social-graph information, or other suitable data related to the online social network. Social-networking system 960 may be accessed by the other components of network environment 900 either directly or via network 910. In particular embodiments, social-networking system 960 may include one or more servers 962. Each server 962 may be a unitary server or a distributed server spanning multiple computers or multiple datacenters. Servers 962 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 962 may include hardware, software, or embedded logic components or a combination of two or more such components for carrying out the appropriate functionalities implemented or supported by server 962. In particular embodiments, social-networking system 964 may include one or more data stores 964. Data stores 964 may be used to store various types of information. In particular embodiments, the information stored in data stores 964 may be organized according to specific data structures. In particular embodiments, each data store 964 may be a relational, columnar, correlation, or other suitable database. Although this disclosure describes or illustrates particular types of databases, this disclosure contemplates any suitable types of databases. Particular embodiments may provide interfaces that enable a client system 930, a social-networking system 960, or a third-party system 970 to manage, retrieve, modify, add, or delete, the information stored in data store 964.

In particular embodiments, social-networking system 960 may store one or more social graphs in one or more data stores 964. In particular embodiments, a social graph may include multiple nodes—which may include multiple user nodes (each corresponding to a particular user) or multiple concept nodes (each corresponding to a particular concept)—and multiple edges connecting the nodes. Social-networking system 960 may provide users of the online social network the ability to communicate and interact with other users. In particular embodiments, users may join the online social network via social-networking system 960 and then add connections (e.g., relationships) to a number of other users of social-networking system 960 whom they want to be connected to. Herein, the term "friend" may refer to any other user of social-networking system 960 with whom a user has formed a connection, association, or relationship via social-networking system 960.

In particular embodiments, social-networking system 960 may provide users with the ability to take actions on various types of items or objects, supported by social-networking system 960. As an example and not by way of limitation, the items and objects may include groups or social networks to which users of social-networking system 960 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 960 or by an external system of third-party system 970, which is separate from social-networking system 960 and coupled to social-networking system 960 via a network 910.

In particular embodiments, social-networking system 960 may be capable of linking a variety of entities. As an example and not by way of limitation, social-networking system 960 may enable users to interact with each other as well as receive content from third-party systems 970 or other entities, or to allow users to interact with these entities through an application programming interfaces (API) or other communication channels.

In particular embodiments, a third-party system 970 may include one or more types of servers, one or more data stores, one or more interfaces, including but not limited to APIs, one or more web services, one or more content sources, one or more networks, or any other suitable components, e.g., that servers may communicate with. A third-party system 970 may be operated by a different entity from an entity operating social-networking system 960. In particular embodiments, however, social-networking system 960 and third-party systems 970 may operate in conjunction with each other to provide social-networking services to users of social-networking system 960 or third-party systems 970. In this sense, social-networking system 960 may provide a platform, or backbone, which other systems, such as third-party systems 970, may use to provide social-networking services and functionality to users across the Internet.

In particular embodiments, a third-party system 970 may include a third-party content object provider. A third-party content object provider may include one or more sources of content objects, which may be communicated to a client system 930. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 960 also includes user-generated content objects, which may enhance a user's interactions with social-networking system 960. User-generated content may include anything a user can add, upload, send, or "post" to social-networking system 960. As an example and not by way of limitation, a user communicates posts to social-networking system 960 from a client system 930. Posts may include data such as status updates or other textual data, location information, photos, videos, links, music or other similar data or media. Content may also be added to social-networking system 960 by a third-party through a "communication channel," such as a newsfeed or stream.

In particular embodiments, social-networking system 960 may include a variety of servers, sub-systems, programs, modules, logs, and data stores. In particular embodiments, social-networking system 960 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 960 may also include suitable components such as network interfaces, security mechanisms, load balancers, failover servers, management-and-network-operations consoles, other suitable components, or any suitable combination thereof. In particular embodiments, social-networking system 960 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 960 to one or more client systems 930 or one or more third-party system 970 via network 910. The web server may include a mail server or other messaging functionality for receiving and routing messages between social-networking system 960 and one or more client systems 930. An API-request server may allow a third-party system 970 to access information from social-networking system 960 by calling one or more APIs. An action logger may be used to receive communications from a web server about a user's actions on or off social-networking system 960. In conjunction with the action log, a third-party-content-object log may be maintained of user exposures to third-party-content objects. A notification controller may provide information regarding content objects to a client system 930. Information may be pushed to a client system 930 as notifications, or information may be pulled from client system 930 responsive to a request received from client system 930. Authorization servers may be used to enforce one or more privacy settings of the users of social-networking system 960. A privacy setting of a user determines how particular information associated with a user can be shared. The authorization server may allow users to opt in to or opt out of having their actions logged by social-networking system 960 or shared with other systems (e.g., third-party system 970), such as, for example, by setting appropriate privacy settings. Third-party-content-object stores may be used to store content objects received from third parties, such as a third-party system 970. Location stores may be used for storing location information received from client systems 930 associated with users. Advertisement-pricing modules may combine social information, the current time, location information, or other suitable information to provide relevant advertisements, in the form of notifications, to a user.

Figure 10:
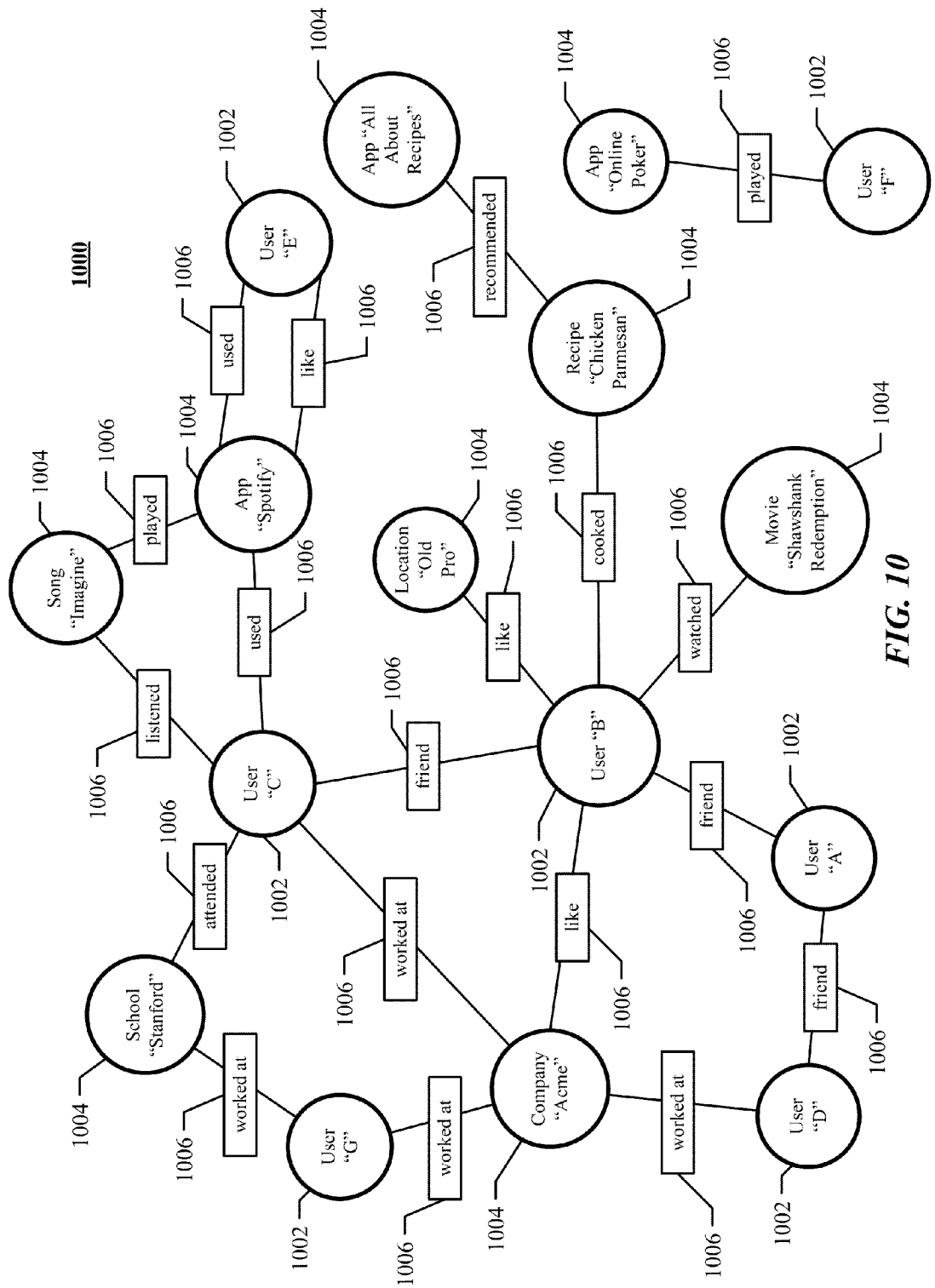
FIG. 10 illustrates an example social graph.

FIG. 10 illustrates example social graph 1000. In particular embodiments, social-networking system 960 may store one or more social graphs 1000 in one or more data stores. In particular embodiments, social graph 1000 may include multiple nodes—which may include multiple user nodes 1002 or multiple concept nodes 1004—and multiple edges 1006 connecting the nodes. Example social graph 1000 illustrated in FIG. 10 is shown, for didactic purposes, in a two-dimensional visual map representation. In particular embodiments, a social-networking system 960, client system 930, or third-party system 970 may access social graph 1000 and related social-graph information for suitable applications. The nodes and edges of social graph 1000 may be stored as data objects, for example, in a data store (such as a social-graph database). Such a data store may include one or more searchable or queryable indexes of nodes or edges of social graph 1000.

In particular embodiments, a user node 1002 may correspond to a user of social-networking system 960. As an example and not by way of limitation, a user may be an individual (human user), an entity (e.g., an enterprise, business, or third-party application), or a group (e.g., of individuals or entities) that interacts or communicates with or over social-networking system 960. In particular embodiments, when a user registers for an account with social-networking system 960, social-networking system 960 may create a user node 1002 corresponding to the user, and store the user node 1002 in one or more data stores. Users and user nodes 1002 described herein may, where appropriate, refer to registered users and user nodes 1002 associated with registered users. In addition or as an alternative, users and user nodes 1002 described herein may, where appropriate, refer to users that have not registered with social-networking system 960. In particular embodiments, a user node 1002 may be associated with information provided by a user or information gathered by various systems, including social-networking system 960. As an example and not by way of limitation, a user may provide his or her name, profile picture, contact information, birth date, sex, marital status, family status, employment, education background, preferences, interests, or other demographic information. In particular embodiments, a user node 1002 may be associated with one or more data objects corresponding to information associated with a user. In particular embodiments, a user node 1002 may correspond to one or more webpages.

In particular embodiments, a concept node 1004 may correspond to a concept. As an example and not by way of limitation, a concept may correspond to a place (such as, for example, a movie theater, restaurant, landmark, or city); a website (such as, for example, a website associated with social-network system 960 or a third-party website associated with a web-application server); an entity (such as, for example, a person, business, group, sports team, or celebrity); a resource (such as, for example, an audio file, video file, digital photo, text file, structured document, or application) which may be located within social-networking system 960 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1004 may be associated with information of a concept provided by a user or information gathered by various systems, including social-networking system 960. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1004 may be associated with one or more data objects corresponding to information associated with concept node 1004. In particular embodiments, a concept node 1004 may correspond to one or more webpages.

In particular embodiments, a node in social graph 1000 may represent or be represented by a webpage (which may be referred to as a "profile page"). Profile pages may be hosted by or accessible to social-networking system 960. Profile pages may also be hosted on third-party websites associated with a third-party server 970. As an example and not by way of limitation, a profile page corresponding to a particular external webpage may be the particular external webpage and the profile page may correspond to a particular concept node 1004. Profile pages may be viewable by all or a selected subset of other users. As an example and not by way of limitation, a user node 1002 may have a corresponding user-profile page in which the corresponding user may add content, make declarations, or otherwise express himself or herself. As another example and not by way of limitation, a concept node 1004 may have a corresponding concept-profile page in which one or more users may add content, make declarations, or express themselves, particularly in relation to the concept corresponding to concept node 1004.

In particular embodiments, a concept node 1004 may represent a third-party webpage or resource hosted by a third-party system 970. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 930 to send to social-networking system 960 a message indicating the user's action. In response to the message, social-networking system 960 may create an edge (e.g., an "eat" edge) between a user node 1002 corresponding to the user and a concept node 1004 corresponding to the third-party webpage or resource and store edge 1006 in one or more data stores.

In particular embodiments, a pair of nodes in social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, social-networking system 960 may send a "friend request" to the second user. If the second user confirms the "friend request," social-networking system 960 may create an edge 1006 connecting the first user's user node 1002 to the second user's user node 1002 in social graph 1000 and store edge 1006 as social-graph information in one or more of data stores 964. In the example of FIG. 10, social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1000 by one or more edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like,"

"attended," "played," "listened," "cooked," "worked at," or "watched" a concept, each of which may correspond to a edge type or subtype. A concept-profile page corresponding to a concept node 1004 may include, for example, a selectable "check in" icon (such as, for example, a clickable "check in" icon) or a selectable "add to favorites" icon. Similarly, after a user clicks these icons, social-networking system 960 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 960 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, social-networking system 960 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (SPOTIFY) on an external audio file (the song "Imagine"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept node 1004 for "SPOTIFY").

In particular embodiments, social-networking system 960 may create an edge 1006 between a user node 1002 and a concept node 1004 in social graph 1000. As an example and not by way of limitation, a user viewing a concept-profile page (such as, for example, by using a web browser or a special-purpose application hosted by the user's client system 930) may indicate that he or she likes the concept represented by the concept node 1004 by clicking or selecting a "Like" icon, which may cause the user's client system 930 to send to social-networking system 960 a message indicating the user's liking of the concept associated with the concept-profile page. In response to the message, social-networking system 960 may create an edge 1006 between user node 1002 associated with the user and concept node 1004, as illustrated by "like" edge 1006 between the user and concept node 1004. In particular embodiments, social-networking system 960 may store an edge 1006 in one or more data stores. In particular embodiments, an edge 1006 may be automatically formed by social-networking system 960 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 960). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 960 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 960) or RSVP (e.g., through social-networking system 960) to an event associated with the advertisement. In addition or as an alternative, an advertisement may include social-networking-system context directed to the user. As an example and not by way of limitation, an advertisement may display information about a friend of the user within social-networking system 960 who has taken an action associated with the subject matter of the advertisement.

In particular embodiments, social-networking system 960 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 970 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 960 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 960 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 960 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 960 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 960 may calculate a coefficient based on a user's actions. Social-networking system 960 may monitor such actions on the online social network, on a third-party system 970, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 960 may calculate a coefficient based on the user's actions with particular types of content. The content may be associated with the online social network, a third-party system 970, or another suitable system. The content may include users, profile pages, posts, news stories, headlines, instant messages, chat room conversations, emails, advertisements, pictures, video, music, other suitable objects, or any combination thereof. Social-networking system 960 may analyze a user's actions to determine whether one or more of the actions indicate an affinity for subject matter, content, other users, and so forth. As an example and not by way of limitation, if a user may make frequently posts content related to "coffee" or variants thereof, social-networking system 960 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 960 may calculate a coefficient based on the type of relationship between particular objects. Referencing the social graph

1000, social-networking system 960 may analyze the number and/or type of edges 1006 connecting particular user nodes 1002 and concept nodes 1004 when calculating a coefficient. As an example and not by way of limitation, user nodes 1002 that are connected by a spouse-type edge (representing that the two users are married) may be assigned a higher coefficient than a user nodes 1002 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 960 may determine that the user has a higher coefficient with respect to the first photo than the second photo because having a tagged-in-type relationship with content may be assigned a higher weight and/or rating than having a like-type relationship with content. In particular embodiments, social-networking system 960 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 960 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1000. As an example and not by way of limitation, social-graph entities that are closer in the social graph 1000 (i.e., fewer degrees of separation) may have a higher coefficient than entities that are further apart in the social graph 1000.

In particular embodiments, social-networking system 960 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 930 of the user). A first user may be more interested in other users or concepts that are closer to the first user. As an example and not by way of limitation, if a user is one mile from an airport and two miles from a gas station, social-networking system 960 may determine that the user has a higher coefficient for the airport than the gas station based on the proximity of the airport to the user.

In particular embodiments, social-networking system 960 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 960 may provide information that is relevant to user's interests and current circumstances, increasing the likelihood that they will find such information of interest. In particular embodiments, social-networking system 960 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 960 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 960 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 970 (e.g., via an API or other communication channel), or from another suitable system. In response to the request, social-networking system 960 may calculate the coefficient (or access the coefficient information if it has previously been calculated and stored). In particular embodiments, social-networking system 960 may measure an affinity with respect to a particular process. Different processes (both internal and external to the online social network) may request a coefficient for a particular object or set of objects. Social-networking system 960 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1004 corresponding to a particular photo may have a privacy setting specifying that the photo may only be accessed by users tagged in the photo and their friends. In particular embodiments, privacy settings may allow users to opt in or opt out of having their actions logged by social-networking system 960 or shared with other systems (e.g., third-party system 970). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 970, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 962 may be authorization/privacy servers for enforcing privacy settings. In response to a request from a user (or other entity) for a particular object stored in a data store 964, social-networking system 960 may send a request to the data store 964 for the object. The request may identify the user associated with the request and may only be sent to the user (or a client system 930 of the user) if the authorization server determines that the user is authorized to access the object based on the privacy settings associated with the object. If the requesting user is not authorized to access the object, the authorization server may prevent the requested object from being retrieved from the data store 964, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 11:
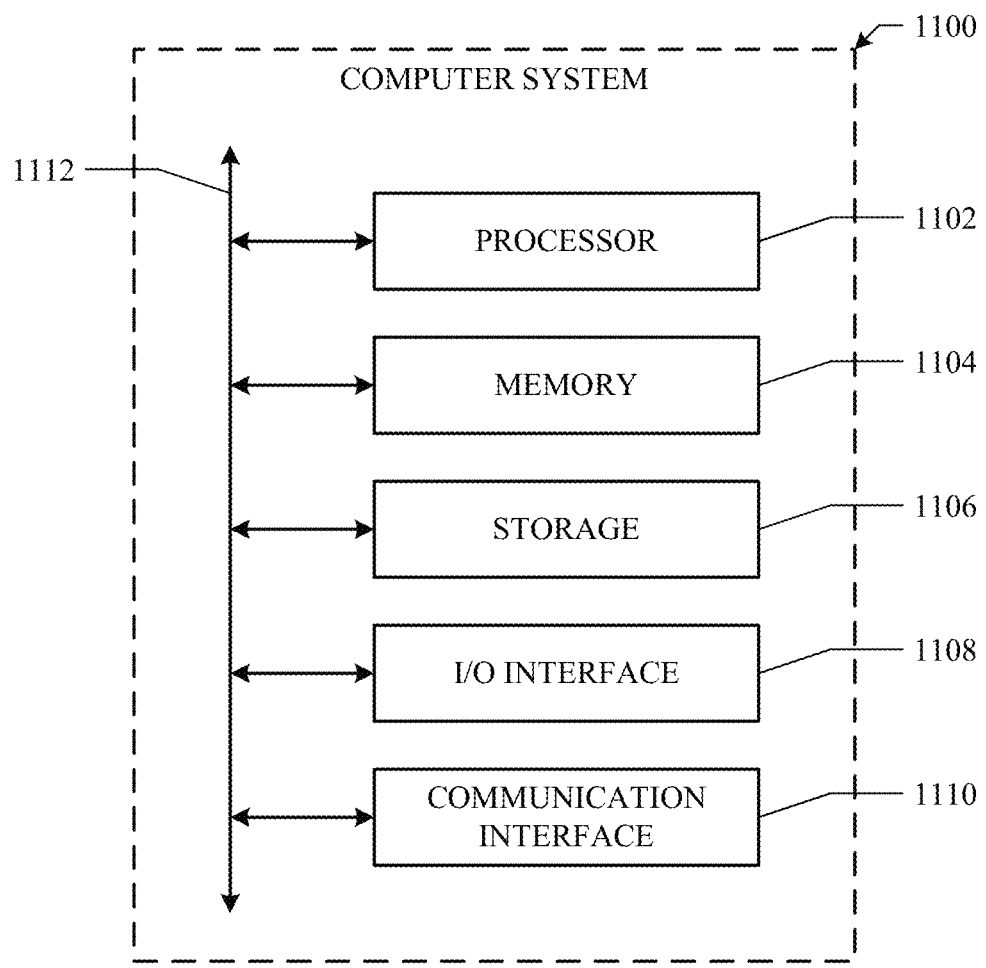
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a computing device, accessing a plurality of pre-generated ideograms, wherein each pre-generated ideogram corresponds to one or more expressions;
by the computing device, analyzing an image to identify, from a plurality of users, a particular user corresponding to a face shown in the image;
by the computing device, analyzing the image to classify at least one expression present on the face shown in the image, the analysis being based on a comparison between a set of facial-feature attributes detected on the face shown in the image and a set of benchmark metrics uniquely associated with the particular user identified as corresponding to the face shown in the image, wherein the benchmark metrics correspond to metrics of facial features for a particular expression;
by the computing device, selecting one or more of the plurality of pre-generated ideograms based on one or more match scores, wherein the match scores are calculated based on the classified at least one expression present on the face shown in the image and a usage history associated with the particular user; and
by the computing device, presenting, on a screen associated with the computing device, the selected one or more pre-generated ideograms,
wherein the usage history associated with the particular user comprises previous user-inputted selections of ideograms for one or more of the facial-feature attributes detected for one or more previously-classified images associated with the particular user.

2. The method of claim 1, wherein the analyzing the image to classify the at least one expression present on the face comprises:
detecting the face in the image;
generating a characterization of features of the face; and
classifying the at least one expression based on the characterization.

3. The method of claim 2, wherein the face is associated with a user, and wherein the generating the characterization of the features comprises:
characterizing attributes of the features with respect to benchmark metrics for a particular expression.

4. The method of claim 3, wherein the benchmark metrics for the features of the face associated with the user comprise a characterization of attributes of the features when the particular expression is present on the face.

5. The method of claim 2, wherein the face is associated with a user, and wherein the generating the characterization of the features comprises:
characterizing attributes of the features with respect to benchmark metrics for the features, wherein the benchmark metrics are stored in association with a user profile for the user.

6. The method of claim 1, wherein the match scores are determined based on an ideogram dictionary or an ideogram usage history.

7. The method of claim 6, wherein the ideogram dictionary or the ideogram usage history is associated with a user, associated with one or more social-networking connections of the user, associated with one or more users sharing common attributes with the user, or based on general statistics regarding trending pre-generated ideograms.

8. The method of claim 1, wherein presenting the selected pre-generated ideograms in association with the face comprises providing a user interface including the selected pre-generated ideograms for insertion into a message.

9. The method of claim 1, wherein presenting the selected pre-generated ideograms in association with the face comprises providing a user interface to post the selected pre-generated ideograms for annotation of a content item.

10. One or more computer-readable non-transitory storage media embodying software that is operable when executed to:
   access a plurality of pre-generated ideograms, wherein each pre-generated ideogram corresponds to one or more expressions;
   analyze an image to identify, from a plurality of users, a particular user corresponding to a face shown in the image;
   analyze the image to classify at least one expression present on the face shown in the image, the analysis being based on a comparison between a set of facial-feature attributes detected on the face shown in the image and a set of benchmark metrics uniquely associated with the particular user identified as corresponding to the face shown in the image, wherein the benchmark metrics correspond to metrics of facial features for a particular expression;
   select one or more of the plurality of pre-generated ideograms based on one or more match scores, wherein the match scores are calculated based on the classified at least one expression present on the face shown in the image and a usage history associated with the particular user; and
   present, on a screen associated with the computing device, the selected one or more pre-generated ideograms,
   wherein the usage history associated with the particular user comprises previous user-inputted selections of ideograms for one or more of the facial-feature attributes detected for one or more previously-classified images associated with the particular user.

11. The media of claim 10, wherein the software operable when executed to analyze the image to classify the at least one expression present on the face comprises software operable when executed to:
   detect the face in the image;
   generate a characterization of features of the face; and
   classify the at least one expression based on the characterization.

12. The media of claim 11, wherein the face is associated with a user, and wherein the software operable when executed to generate the characterization of the features comprises software operable when executed to:
   characterize attributes of the features with respect to benchmark metrics for a particular expression.

13. The media of claim 12, wherein the benchmark metrics for the features of the face associated with the user comprise a characterization of attributes of the features when the particular expression is present on the face.

14. The media of claim 11, wherein the face is associated with a user, and wherein the software operable when executed to generate the characterization of the features comprises software operable when executed to:
   characterize attributes of the features with respect to benchmark metrics for the features, wherein the benchmark metrics are stored in association with a user profile for the user.

15. A system comprising:
   one or more processors; and
   a memory coupled to the processors comprising instructions executable by the processors, the processors being operable when executing the instructions to:
      access a plurality of pre-generated ideograms, wherein each pre-generated ideogram corresponds to one or more expressions;
      analyze an image to identify, from a plurality of users, a particular user corresponding to a face shown in the image;
      analyze the image to classify at least one expression present on the face shown in the image, the analysis being based on a comparison between a set of facial-feature attributes detected on the face shown in the image and a set of benchmark metrics uniquely associated with the particular user identified as corresponding to the face shown in the image, wherein the benchmark metrics correspond to metrics of facial features for a particular expression;
      select one or more of the plurality of pre-generated ideograms based on one or more match scores, wherein the match scores are calculated based on the classified at least one expression present on the face shown in the image and a usage history associated with the particular user; and
      present, on a screen associated with the computing device, the selected one or more pre-generated ideograms,
   wherein the usage history associated with the particular user comprises previous user-inputted selections of ideograms for one or more of the facial-feature attributes detected for one or more previously-classified images associated with the particular user.

16. The system of claim 15, wherein the processors being operable when executing the instructions to analyze the image to classify the at least one expression present on the face comprises the processors being operable when executing the instructions to:
   detect the face in the image;
   generate a characterization of features of the face; and
   classify the at least one expression based on the characterization.

17. The system of claim 15, wherein the match scores are determined based on an ideogram dictionary or an ideogram usage history.

18. The system of claim 17, wherein the ideogram dictionary or the ideogram usage history is associated with a user, associated with one or more social-networking connections of the user, associated with one or more users sharing common attributes with the user, or based on general statistics regarding trending pre-generated ideograms.

19. The system of claim 15, wherein the processors being operable when executing the instructions to present the selected pre-generated ideograms in association with the face comprises the processors being operable when executing the instructions to provide a user interface to post the selected pre-generated ideograms for annotation of a content item.

20. The method of claim 1, further comprising presenting the selected one or more pre-generated ideograms in an ordered set, wherein the ordered set is arranged based on the relative match scores of the selected one or more pre-generated ideograms.

* * * * *